United States Patent [19]
Imada

[11] Patent Number: 5,881,324
[45] Date of Patent: *Mar. 9, 1999

[54] IMAGE BLUR PREVENTION APPARATUS

[75] Inventor: Shinji Imada, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 694,449

[22] Filed: Aug. 12, 1996

[30] Foreign Application Priority Data

Aug. 21, 1995 [JP] Japan ................................ 7-234716

[51] Int. Cl.$^6$ .................................................. G03B 7/08
[52] U.S. Cl. .......................................................... 396/42
[58] Field of Search ............................. 396/52.55, 554; 348/208

[56] References Cited

U.S. PATENT DOCUMENTS

| | | | |
|---|---|---|---|
| 5,335,032 | 8/1994 | Onuki et al. | 396/52 |
| 5,386,264 | 1/1995 | Sekine et al. | 396/52 |
| 5,534,967 | 7/1996 | Matsuzawa | 396/55 |
| 5,592,251 | 1/1997 | Kai | 396/55 |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

For image blur prevention, the present invention discloses an apparatus comprising an operation device which performs an initial setting for the image blur prevention (by determining a DC offset in the high-pass filter calculation on an output signal of an image blur detection sensor, from the output signal of the image blur detection sensor); and a determination device which determines a state of a signal (whether it is larger than a predetermined value) influencing the initial setting (the above-mentioned output signal of the image blur detection sensor) at a time when the operation device performs the initial setting operation, thereby enabling appropriate initial setting and thus achieving appropriate image blur prevention. If the output signal is determined as larger than the predetermined value, the initial setting is performed for example in a state where the direction of the optical apparatus is being altered. In such case the initial setting is determined as improper and is performed again.

10 Claims, 22 Drawing Sheets

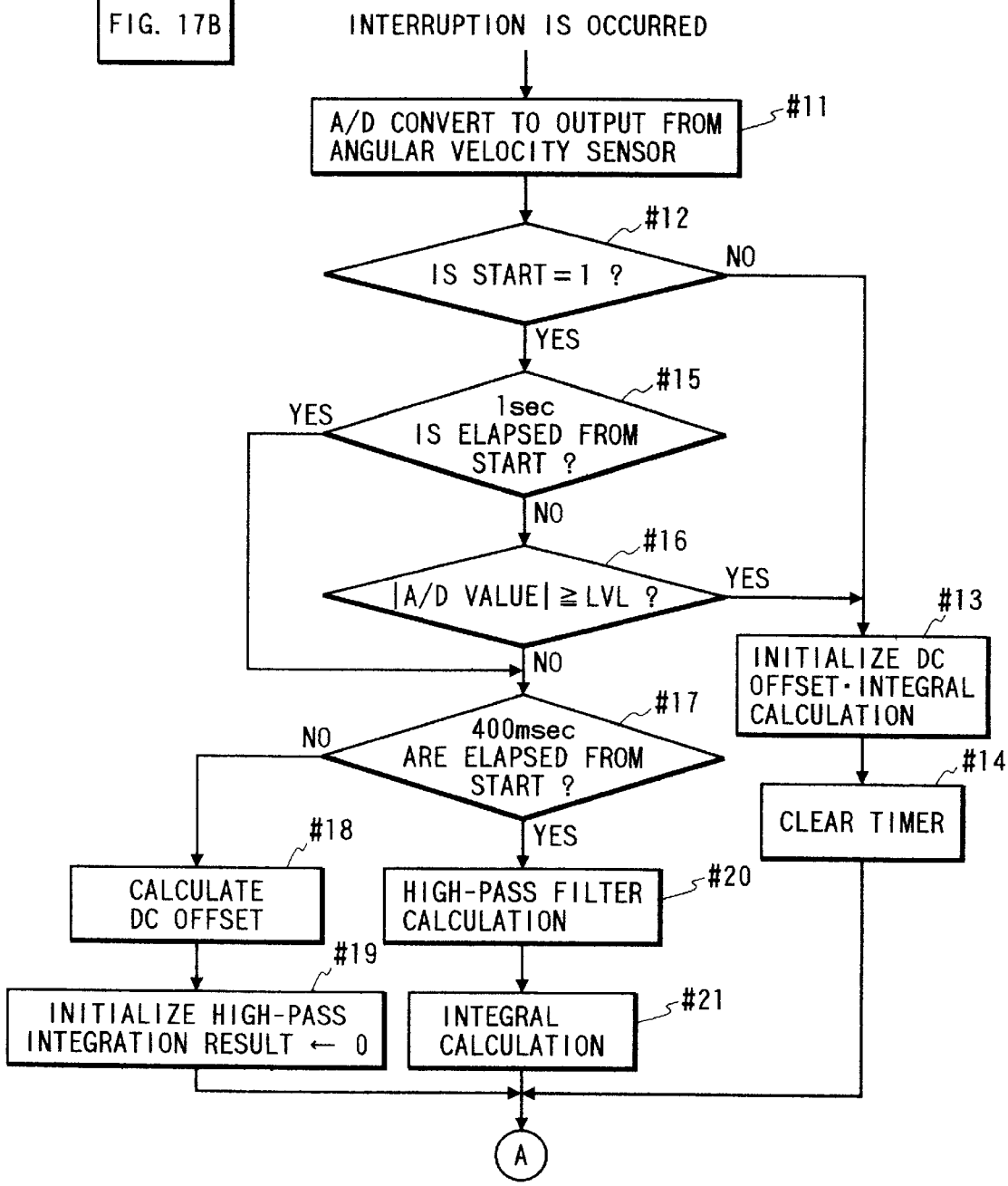

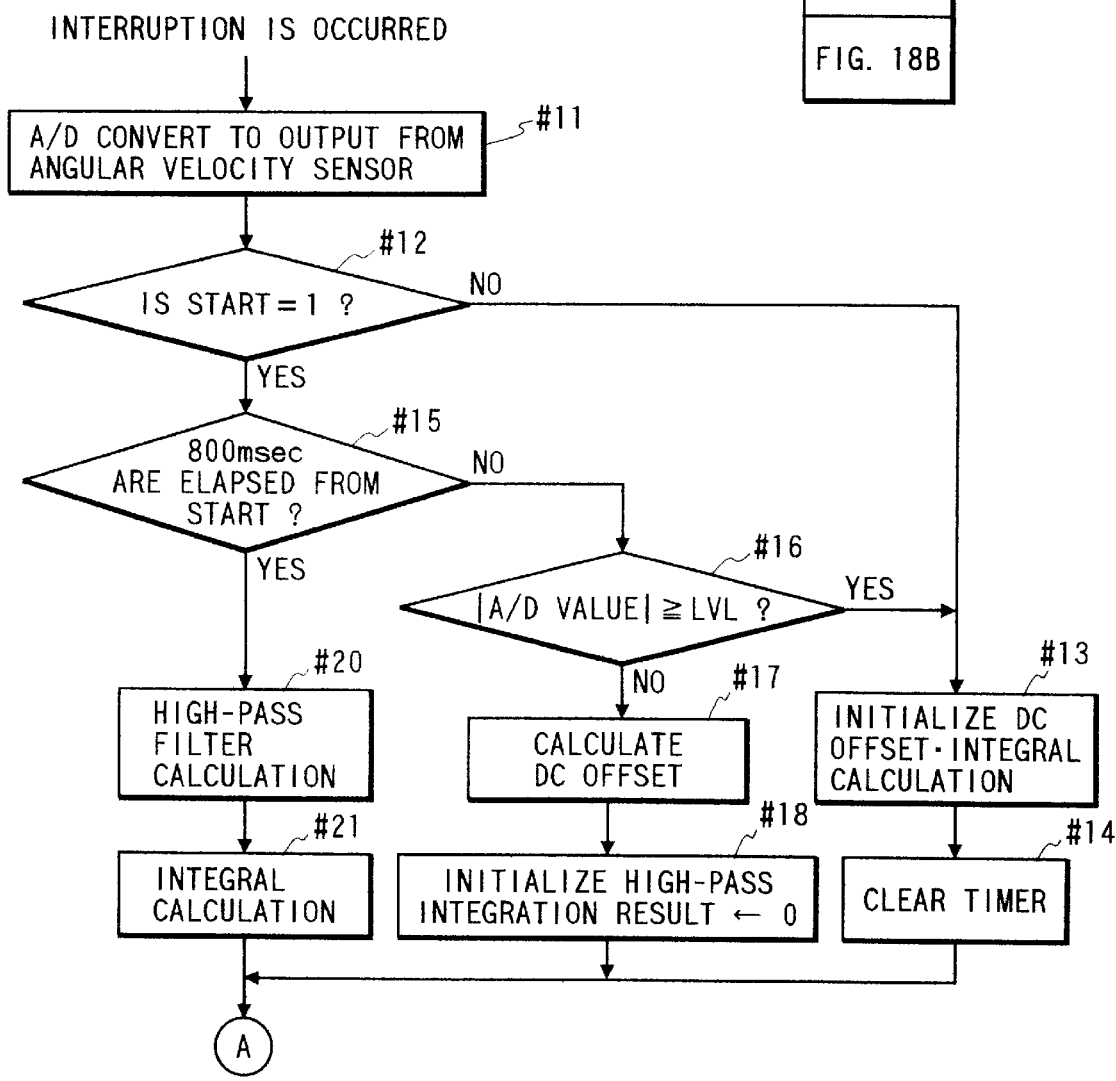

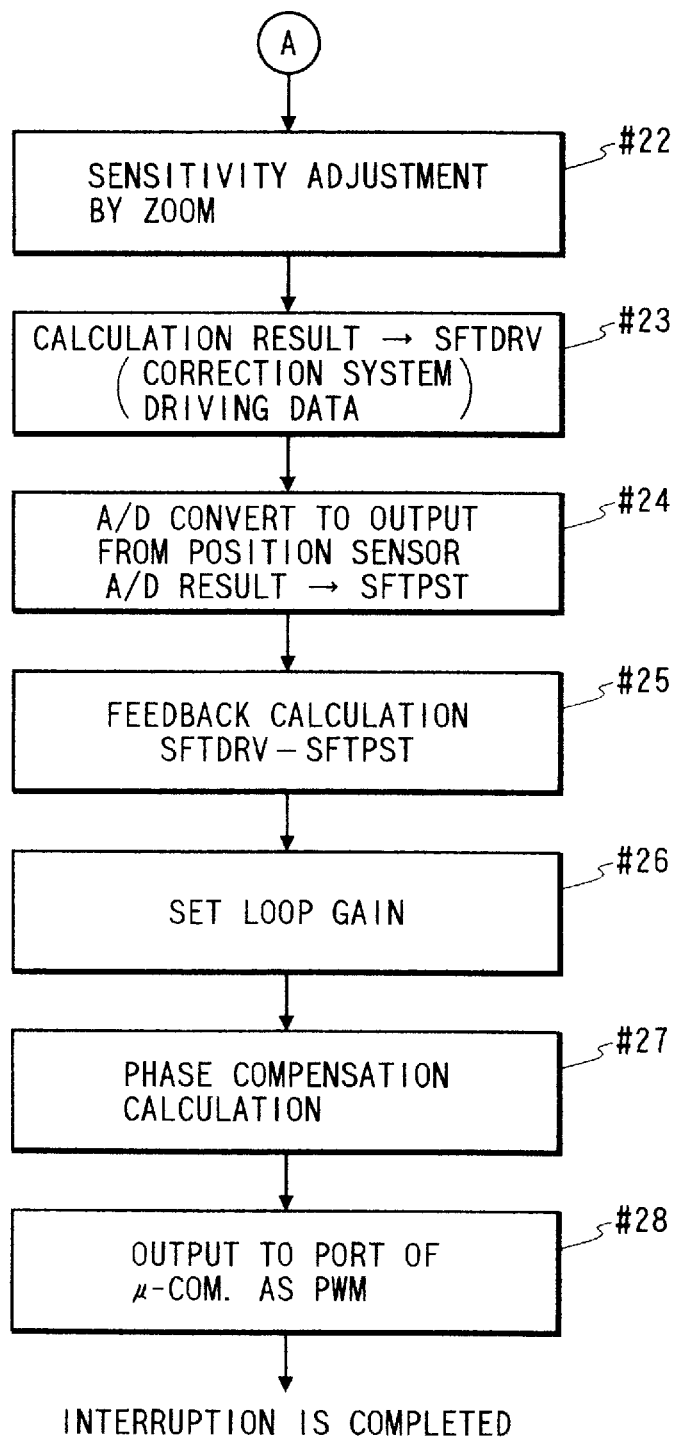

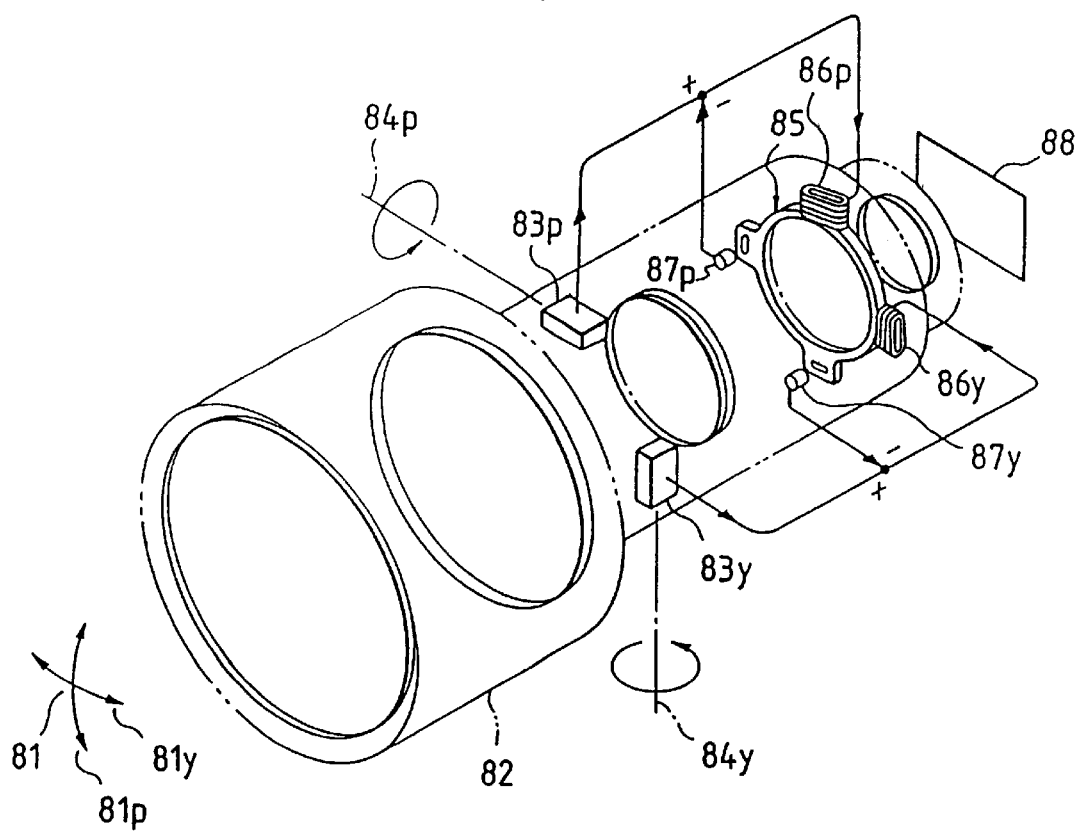

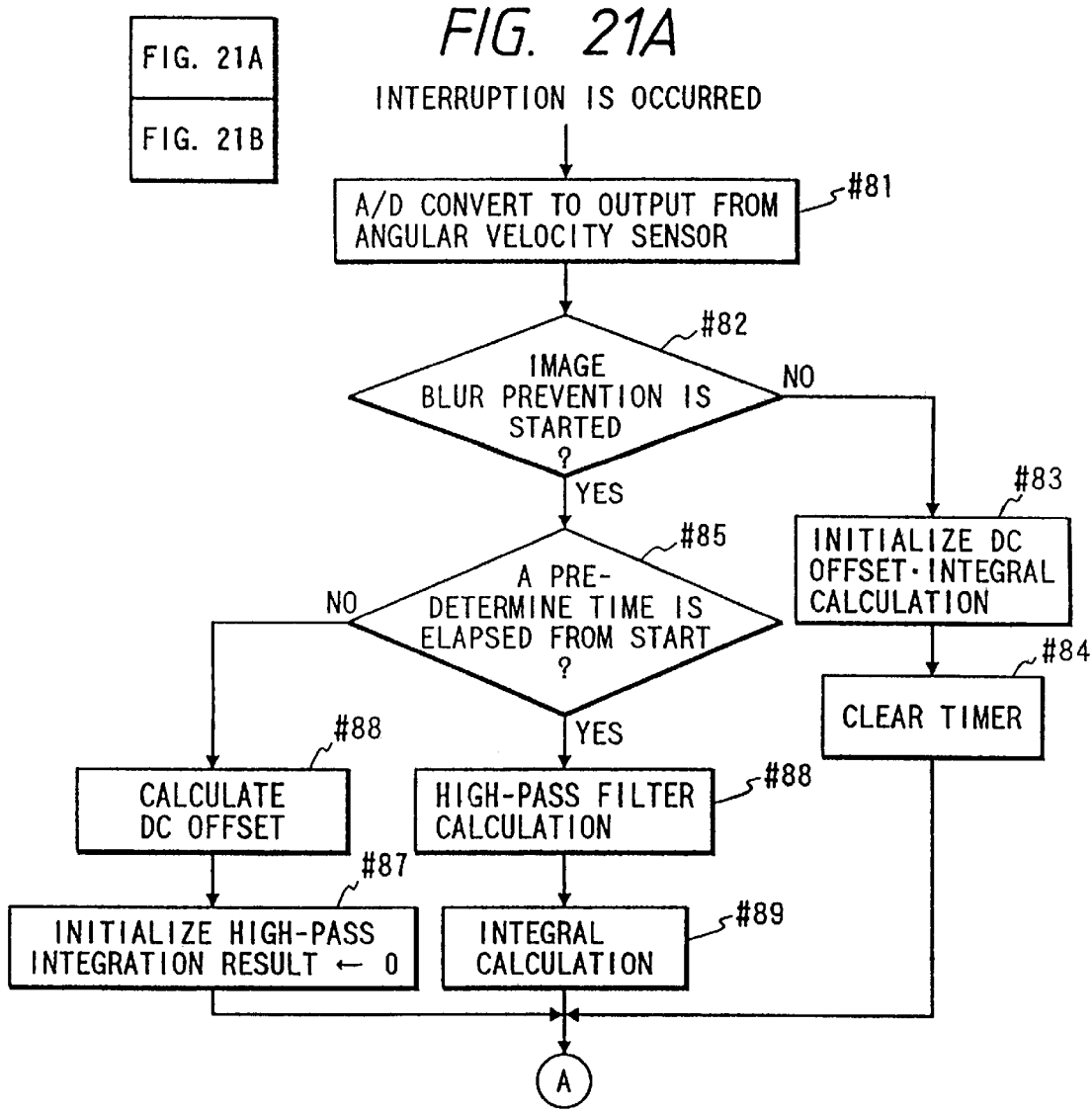

IMAGE BLUR PREVENTION APPARATUS

BACKGROUND OF THE INVENTION

1. Field of the Invention

The present invention relates to an image blur prevention apparatus for preventing image blur generated in a camera, an optical apparatus (device) or the like.

2. Related Background Art

In recent cameras, the probability of failure in the phototaking operation is very low even for an unskilled person for the camera operation, because the important operations for phototaking such as determination of exposure and focusing are all automated.

Also there has been developed an image blur prevention system for avoiding hand fluctuation applied to the camera, and almost no factor is left to induce the error of the photographer in phototaking. Such image blur prevention system will be explained briefly.

The hand fluctuation applied to the camera in phototaking operation is generally a vibration of a frequency of 1 to 12 Hz. The basic concept for obtaining a photograph without image blur even in the presence of such hand fluctuation when the shutter is released is to detect the fluctuation of the camera induced by such hand fluctuation and to displace a correction lens according to the detected value.

More specifically, in order to obtain a photograph without image blur even in the presence of camera fluctuation, it is essential to first detect the fluctuation of the camera exactly, and then to correct the variation in the optical axis resulting from the hand fluctuation. The detection of such camera fluctuation is achieved, in principle, by providing the camera with fluctuation detection means for detecting the angular acceleration, angular velocity or angular displacement, and camera fluctuation detection means for releasing an angular displacement by integrating the output signal of such fluctuation detection means in electrical or mechanical manner. The image blur prevention is achieved by displacing optical support means (correction means), supporting an optical element such as a lens or a prism, in a direction perpendicular to the optical axis, based on the detection information.

FIG. 19 is a schematic view of a fluctuation prevention system employing conventional fluctuation detection means, utilized for example in a camera, for suppressing the image blur in directions indicated by arrows 81 (camera pitching 81p, and camera yawing 81y).

In FIG. 19 there are shown a lens barrel 82;

fluctuation detection means 83p, 83y for respectively detecting the camera pitching (in a direction 84p) and camera yawing (in a direction 84y); correction means 85, supporting a correcting optical element (such as prism or lens), for correcting the image blur resulting from the fluctuation; coils 86p, 86y for providing the correction means 85 with a driving force; and position detectors 87p, 87y for detecting the position of the correction means 85. The correction means 85 functions utilizing a position control loop and using the output signals from the fluctuation detection means 83p, 83y as target values, thereby correcting the image blur resulting from the fluctuation.

FIG. 20 is a schematic block diagram of a conventional image blur correction system, wherein an output signal from fluctuation detection means 2 is amplified by amplifier means 3, and supplied to an A/D converting port of a microcomputer 1. An output signal from position detection means 4, for detecting the position of the correction lens, is amplified by amplifier means 5, and supplied to an A/D converting port of the microcomputer 1. The microcomputer 1 processes these two data to release correction lens driving data from an output port, thereby causing correction lens driving means 6 to drive the correction lens, thus correcting the image blur. Lock/unlock drive means 7 executes drive of an unlock coil and maintaining of an unlocked state for locking or unlocking the drive for the correction lens.

FIGS. 21A and 21B are flow charts showing the function of the microcomputer 1 shown in FIG. 20. The image blur correction is executed by an interruption process, conducted for example at a predetermined interval. The main flow executes for example the lock/unlock control. When an interruption process is generated, the sequence starts from a step #81.

[Step #81] executes A/D conversion of the output of an angular velocity sensor, constituting the fluctuation detection means.

[Step #82] discriminates whether an instruction for initiating the image blur correction has been received, and the sequence proceeds to a step #85 or #83, respectively, if the instruction has been received or not.

Steps #83 and #84 are operations when the image blur correction is not conducted.

[Step #83] initializes the DC offset and the integration, as the image blur correction is not executed.

[Step #84] clears a timer for measuring the time after the reception of the image blur correction starting instruction.

[Step #85] discriminates whether a predetermined time has elapsed since the reception of the image blur correction starting instruction. This corresponds to an operation time for determining the DC offset in a step #86, so that the image blur correction is not yet executed. The sequence proceeds to a step #88 or #86, respectively if the predetermined time has elapsed or not.

Steps #86 and #87 are operations within the predetermined time after the reception of the image blur correction starting instruction.

[Step #86] calculates the DC offset, in order to avoid that the initial input to the high-pass filter becomes a stepped input because of the DC component.

[Step #87] initializes the high-pass filter and sets the result of integration to zero, in order to electrically maintain the correction lens at the central position.

Steps starting from #88 execute the image blur correction.

[Step #88] effects a high-pass filter operation, in order to effect the image blur correction.

[Step #89] executes integration, to provide angular displacement data.

[Step #90] adjusts the eccentricity (sensitivity) of the correction lens with respect to the fluctuation angular displacement, since it varies depending on the zoom/focus position.

[Step #91] stores the result of calculation (drive data for image blur correction) in a RAM area, set by SFTDRV in the microcomputer 1.

[Step #92] effects A/D conversion of the output from a position sensor, detecting the position of the correction lens, and stores the result in SFTPST in the RAM.

[Step #93] effects feedback calculation (SFTDRV–SFTPST).

[Step #94] multiplies the result of the calculation in the step #93 with a loop gain.

[Step #95] effects a phase compensating calculation, for obtaining a stable control system.

[Step #96] sends the result of the step #95, as PWM, to the port of the microcomputer, whereupon the interruption process is terminated.

The obtained output is supplied to a coil driver for driving the correction lens, thereby driving the correction lens with a moving coil to correct the image blur.

The image blur correction is achieved in the configuration and the system explained above.

The output signal of the angular velocity sensor, constituting the fluctuation detection means, is the sum of a DC component and a hand fluctuation component, as indicated by a solid line 10S1 in FIG. 22A. Consequently, the step #85 in FIG. 21A effects averaging by the application of a low-pass filter, thereby reducing the hand fluctuation component and determining the DC offset. Then the value of a broken line 10S2, after the lapse of a predetermined time, is regarded as the DC offset, and the value obtained by subtracting the DC offset from the A/D converted value of the output of the angular velocity sensor is used as the input data for the high-pass filter calculation.

In the ordinary hand-held state of the camera, the error between the actual DC offset and the above-determined DC offset (different between a DC offset signal 10R1 in FIG. 22A, indicating the actual DC offset, and the broken line 10S2 obtained with the low-pass filter) is small and negligible. However, if the image blur correction is started while the camera is swung in a large motion, the angular velocity signal assumes a form as indicated by a solid line 10S3 in FIG. 22B and can only provide a broken-lined signal 10S4 even after averaging with a low-pass filter, thus resulting in a significant error from the actual DC offset indicated by 10R2.

Such signal results in a significant transient response by the stepped input in the high-pass filter operation, deteriorating the start-up characteristics of the image blur correction.

SUMMARY OF THE INVENTION

One aspect of the present invention is, in an apparatus applied for image blur prevention, to provide a configuration comprising an operation device which performs an initial setting for the image blur prevention, and a determination device which determines a state of a signal influencing the initial setting at a time when the operation device performs the initial setting operation, thereby providing an appropriate initial setting and thus achieving appropriate image blur prevention.

Another aspect of the present invention is, in an apparatus applied for image blur prevention, to provide a configuration comprising an operation device which performs an initial setting of a processing circuit for processing an output signal from an image blur detection sensor for detecting an image blur state; and a determination device which determines whether the operation device performs a predetermined initial setting operation, thereby providing an appropriate initial setting and thus achieving appropriate image blur prevention.

Still another aspect of the present invention is, in an apparatus applied for image blur prevention, to provide a configuration comprising an operation device which performs an initial setting for the image blur prevention, and a control device which causes the operation device to perform the initial setting operation again if the operation device does not perform a predetermined initial setting, thereby providing an appropriate initial setting and thus achieving appropriate image blur prevention.

BRIEF DESCRIPTION OF THE DRAWINGS

FIG. 18 is comprised of FIGS. 18A and 18B illustrating flow charts showing the function of the embodiment 2 of the present invention;

FIG. 19 is a schematic perspective view of a conventional lens barrel;

DETAILED DESCRIPTION OF THE PREFERRED EMBODIMENTS

Figure 1:
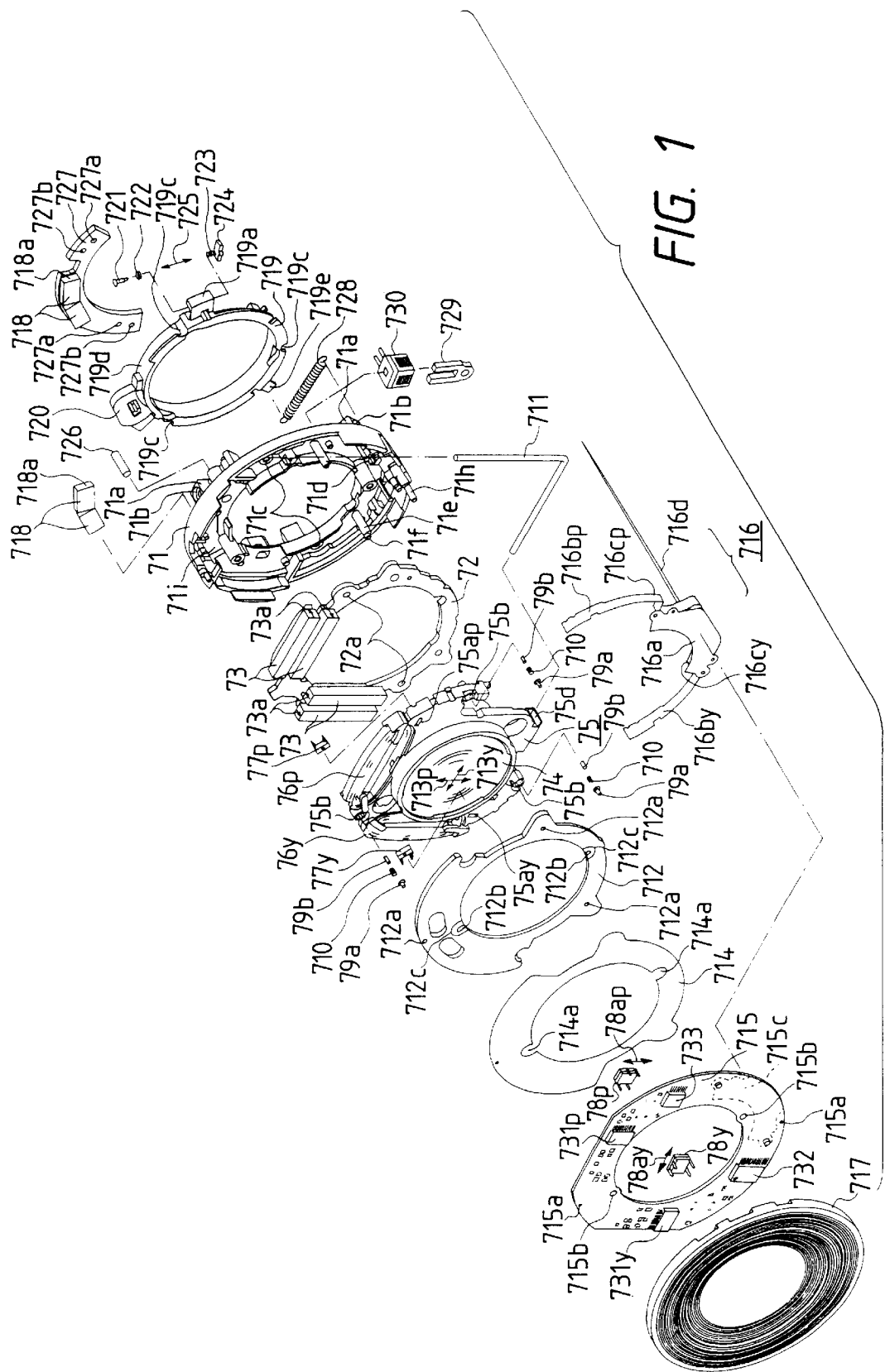
FIG. 1 is an exploded perspective view of a lens barrel in an embodiment 1 of the present invention.

FIG. 1 is an exploded perspective view of a lens barrel of an optical equipment provided with an image blur prevention system constituting an embodiment 1 of the present invention, wherein rear protruding pins 71a (two of such three pins being illustrated) of a base plate 71 are fitted with a lens barrel (not shown), and a known lens barrel roller or the like is screwed to a hole 71b and fixed to the lens barrel.

A second yoke (fixing unit) 72, composed of a magnetic material and mirror-finish plated, is fixed to the base plate 71, by means of screws passing through peripheral holes 72a and screwed into holes 71c of the base plate 71. On the second yoke 72, there are magnetically adhered permanent magnets (shift magnets) 73, such as neodymium magnets, wherein arrows 73a indicate magnetizing directions. A lens 74, constituting an image blur preventing element, is fixed, for example with C-rings, on a support frame 75, on which coils 76p, 76y (shift coils) are adhered. Also light-emitting elements 77p, 77y such as IRED are adhered to the rear face of the support frame 75, and the emitted light beams enter, through slits 75*ap*, 75*ay*, position detecting elements 78*p*, 78*y* such as PSD to be explained later.

Figure 2:
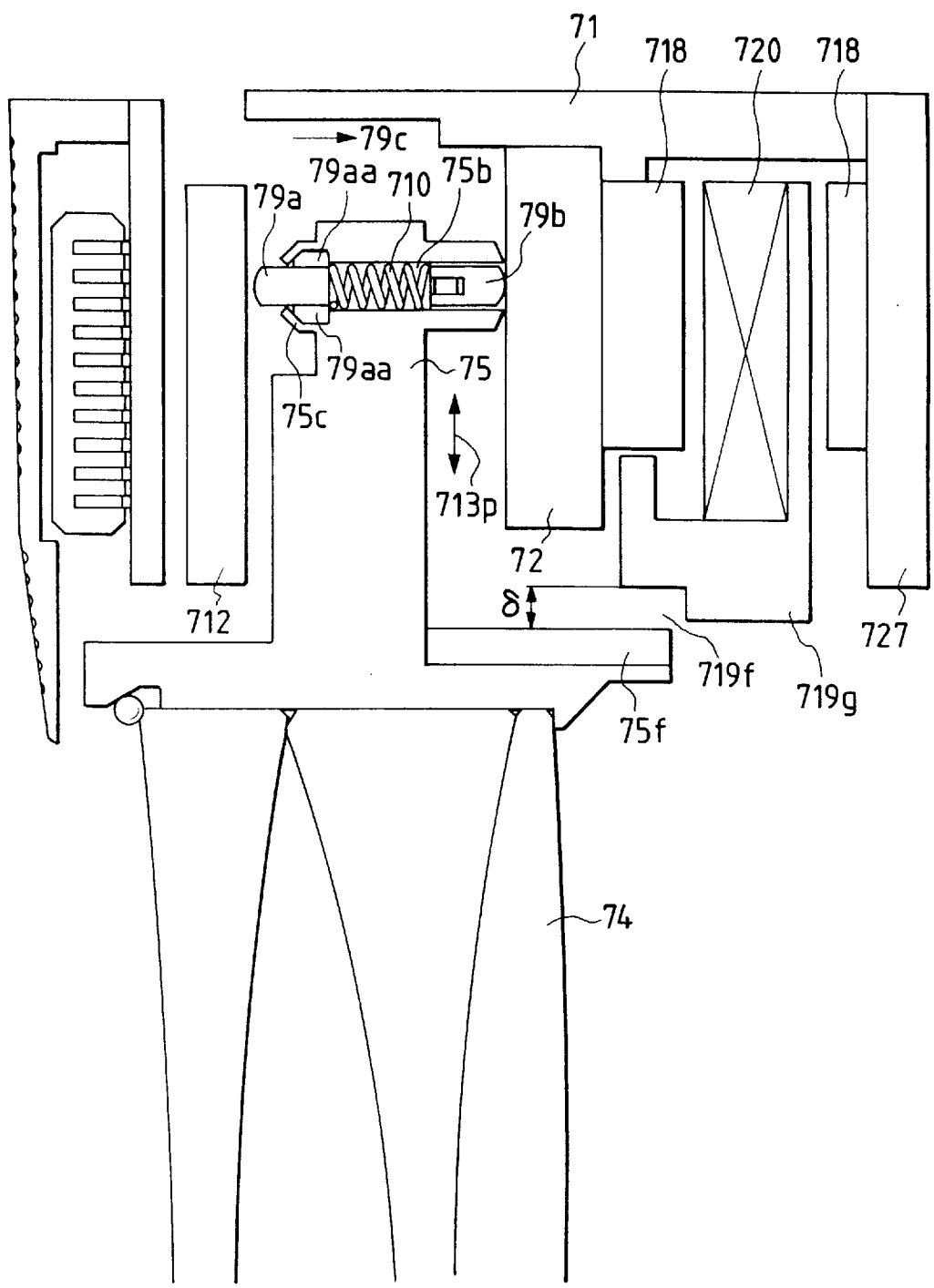
FIG. 2 is a schematic cross-sectional view of a part of the lens barrel shown in FIG. 1.

In each of three holes 75*b* of the support frame 75, there are fitted support members 79*a*, 79*b* with a semispherical end and a charge spring 710 as shown in FIG. 2, and the support member 79*a* is fixed by heat caulking to the support frame 75 (support member 79*b* being slidable along the hole 75*b*, against the spring force of the charge spring 710).

FIG. 2 is a longitudinal cross-sectional view of the lens barrel after assembly thereof. In the hole 75*b* of the support frame 75, there are fitted in succession, in a direction 79*c*, the support member 79*b*, the charge spring 710 in a charged state and the support member 79*a* (wherein the support members 79*a* and 79*b* being of a same shape), and the periphery 75*c* of the hole 75*b* is heat caulked to maintain the support member 79*a* in position.

Figure 3:
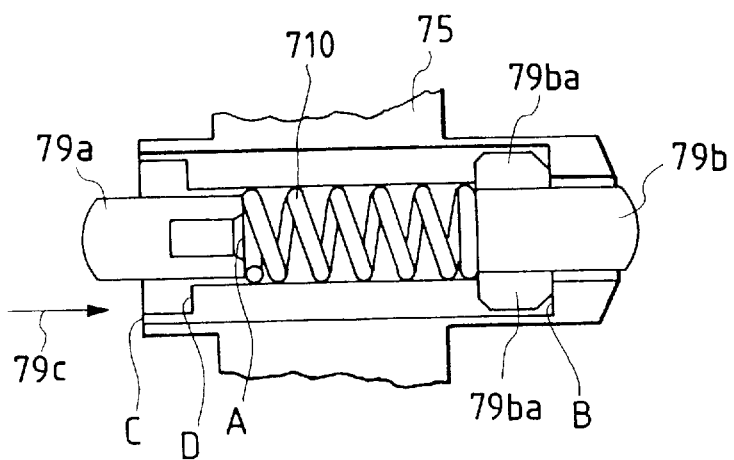
FIG. 3 is a schematic view of a part of the configuration shown in FIG. 2.
Figure 4:
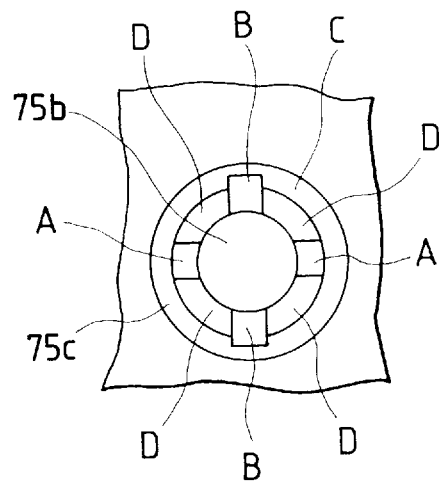
FIG. 4 is a schematic plan view seen from the direction of an arrow 79c in FIG. 3.

FIG. 3 is a partial cross-sectional view of the hole 75*b* along a plane perpendicular to that of FIG. 2, and FIG. 4 is a schematic plan view seen in a direction indicated by an arrow 79*c* in FIG. 3, wherein points A–D respectively correspond to those in FIG. 3. The rear end of a winged portion 79*aa* of the support member 79*a* is received and limited to a face of a depth A, and the support member 79*a* is thus fixed to the support frame 75 by heat caulking of the periphery 75*c*.

The front end of the winged portion 79*ba* of the support member 79*b* is received at a face of a depth B, whereby the support member 79*b* is prevented from slipping out from the hole 75*b* in a direction 79*c*, by the spring force of the charge spring. When the assembling of the lens barrel is completed, the support member 79*b* is received by the second yoke 72 and is prevented from slipping out of the support frame 75, but the face B is provided for such prevention of slipping out, in consideration of the ease of assembling.

As shown in FIGS. 2 to 4, the hole 75*b* of the support frame 75 is designed so as to be moldable, in case the support frame 75 is formed by molding, without a complex internal sliding mold but with a simple two-piece divided mold that can be extracted in a direction opposite to the arrow 79*c*, thereby providing improved dimensional precision.

Also as the support members 79*a*, 79*b* are the same, it is made possible to avoid errors in the assembling and to facilitate the management of the parts. Referring to FIG. 1, a bearing 75*d* of the support frame 75 is coated for example with fluorinated grease, and an L-shaped shaft 711 (composed of non-magnetic stainless steel) is fitted therein. The other end of the L-shaped shaft 711 is fitted in a bearing 71*d* (similarly coated with grease) formed on the base plate 71, and the support frame 75 together with the three support members 79*b* is placed on the second yoke 72 and accommodated in the base plate 71.

Figure 5:
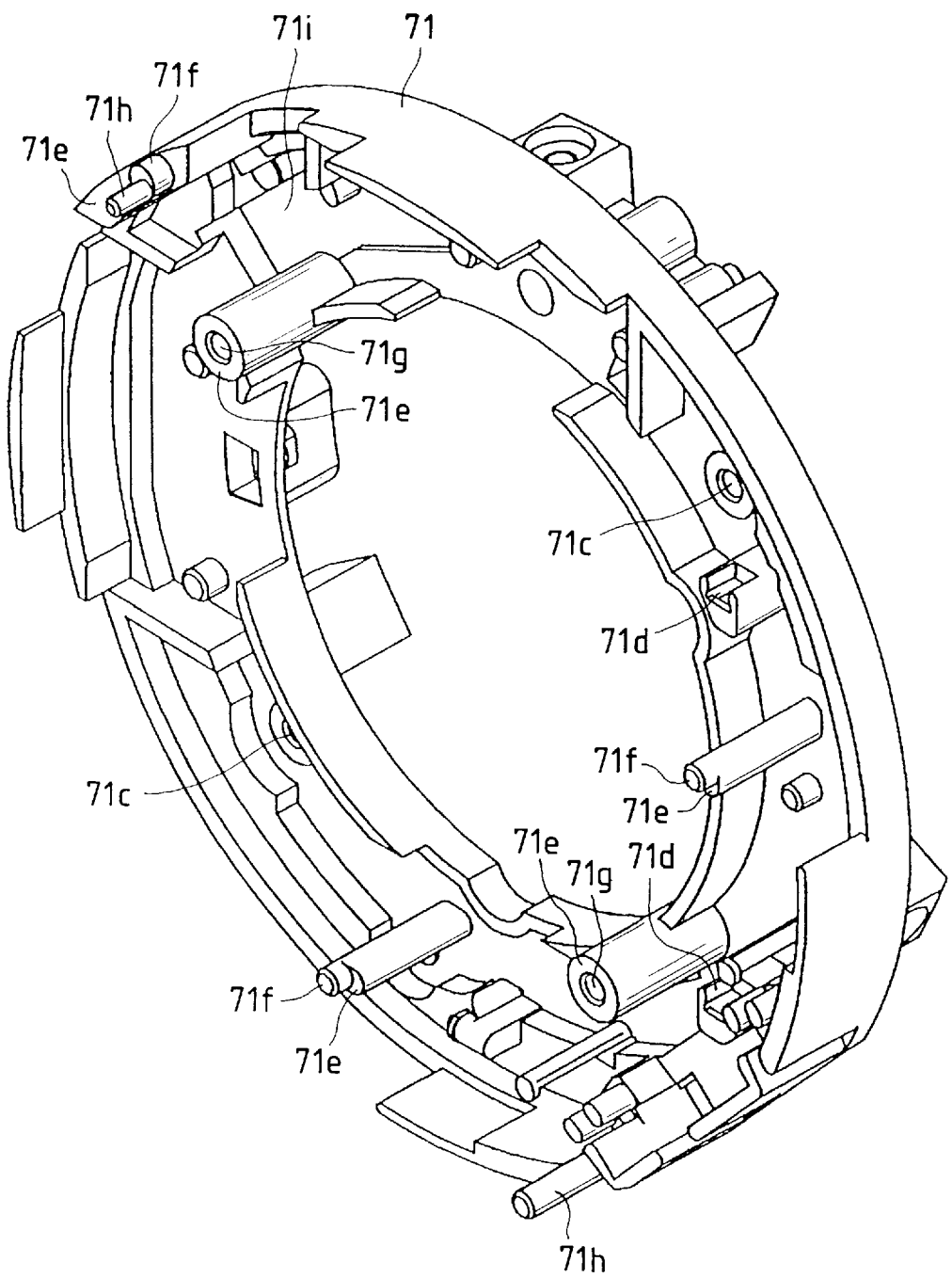
FIGS. 5 and 6 are partial perspective views of the lens barrel shown in FIG. 1.

Three positioning holes 712*a* of a first yoke 712 are fitted with pins 71*f* (provided in three positions in FIG. 5) of the base plate 71, and the first yoke 712 is supported by receiving faces 71*e* (provided in five positions) whereby it is magnetically coupled with the base plate (magnetizing direction of the permanent magnet being indicated by 73*a*). Thus the rear face of the first yoke 712 impinges on the support member 79*a*, whereby the support frame 75 is supported between the first and second yokes 712, 72 and is positioned in the direction of the optical axis.

The contacting faces of the support members 79*a*, 79*b* and the first and second yokes 712, 72 are also coated with the fluorinated grease, whereby the support frame 75 is rendered freely slidable in a plane perpendicular to the optical axis, with respect to the base plate 71. The L-shaped shaft 711 supports the support frame 75 in such a manner that it is only slidable in the directions 713*p*, 713*y* with respect to the base plate 71, thereby limiting the relative rotation (rolling), about the optical axis, of the support frame 75 with respect to the base plate 71.

The L-shaped shaft 711 and the bearings 71*d*, 75*d* are fitted with a large play in the axial direction, in order to avoid fixation in combination with the axial limitation by the supporting with the support members 79*a*, 79*b* and with the first and second yokes 712, 72. The first yoke 712 is surfacially covered with an insulating sheet 714, on which is fixed a hard circuit board 715, bearing plural IC's (position detection elements 78*p*, 78*y*, amplifying IC's, coils 75*p*, 75*y*, driving IC's etc.) by fitting two positioning holes 715*a* with pins 71*h* (FIG. 5) of the base plate 75 and fitting screws through holes 715*b* and holes 712*b* of the first yoke 712 into holes 71*g* of the base plate 71.

Figure 6:
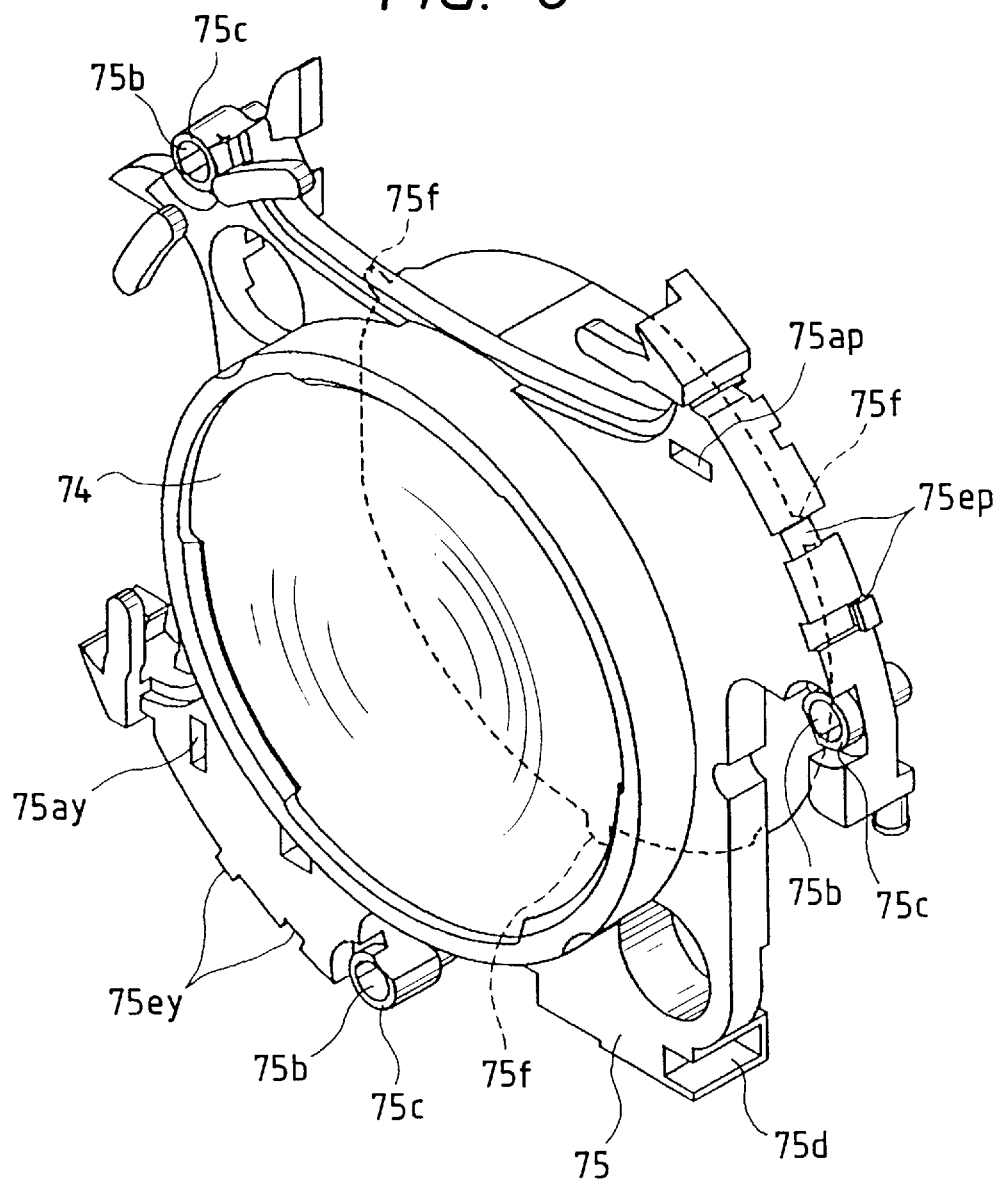

On the hard circuit board 715, position detection elements 78*p*, 78*y* are soldered, in positions determined with a jig. Also a face 716*a* of a flexible circuit board 716 is heat adhered to a broken-lined area 715*c* on the rear face of the hard circuit board 715. A pair of arms 716*bp*, 716*by* extend from the flexible circuit board 716 along a plane perpendicular to the optical axis and respectively engage with engaging portions 75*ep*, 75*ey* of the support frame 75 as shown in FIG. 6, and the terminals of IRED's 77*p*, 77*y* and of coils 76*p*, 76*y* are fixed by soldering.

Thus the IRED's 77*p*, 77*y* and the coils 76*p*, 76*y* are driven by the hard circuit board 715 through the flexible circuit board 716. The arms 716*bp*, 716*by* thereof are respectively provided with bent portions 716*cp*, 716*cy*, which alleviates, by the elasticity thereof, the burden on the arms 716*bp*, 716*by* caused by the movement of the support arm 75 in the plane perpendicular to the optical axis.

The first yoke 712 is provided with embossed protruding faces 712*c*, which are in direct contact with the hard circuit board 715 through holes 714*a* of the insulating sheet 714. The hard circuit board 715 is provided on the contacting faces with grounding patterns, whereby, by screwed coupling of the hard circuit board 715 to the base plate 71, the first yoke 712 is grounded and is prevented from serving as an antenna and giving noises to the hard circuit board 715.

A mask 717 is positioned by pins 71*h* of the base plate 71 and fixed with a double-stick tape on the hard circuit board 715. The base plate 71 is provided with a hole 71*i* for permanent magnet, through which the rear face of the second yoke 72 is exposed. In the hole 71*i* positioned is a permanent magnet 718 (locking magnet) provided on the yoke 727, in magnetic coupling with the second yoke 72.

Figure 7:
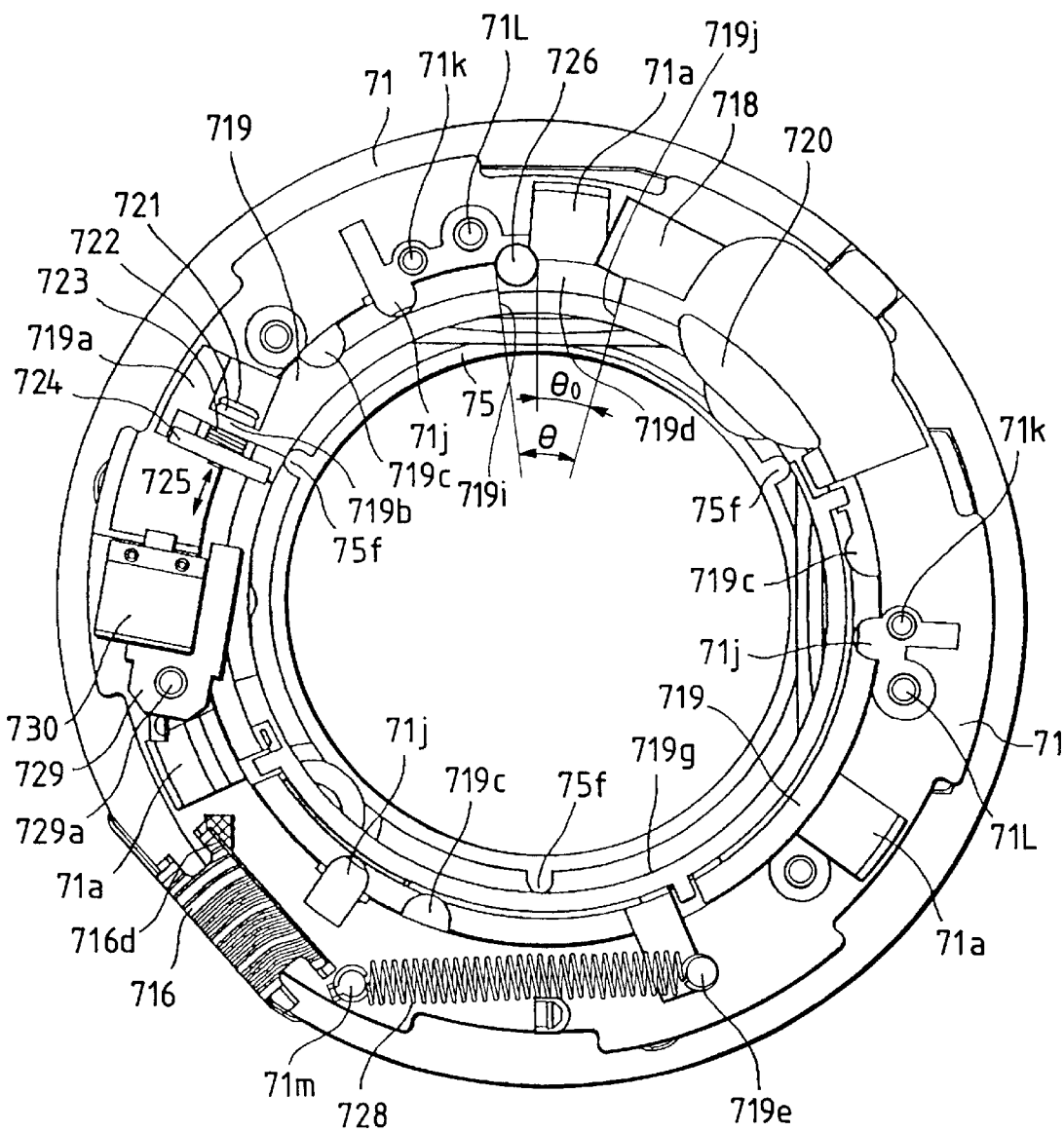
FIG. 7 is a plan view of a part of the lens barrel shown in FIG. 1.
Figure 8:
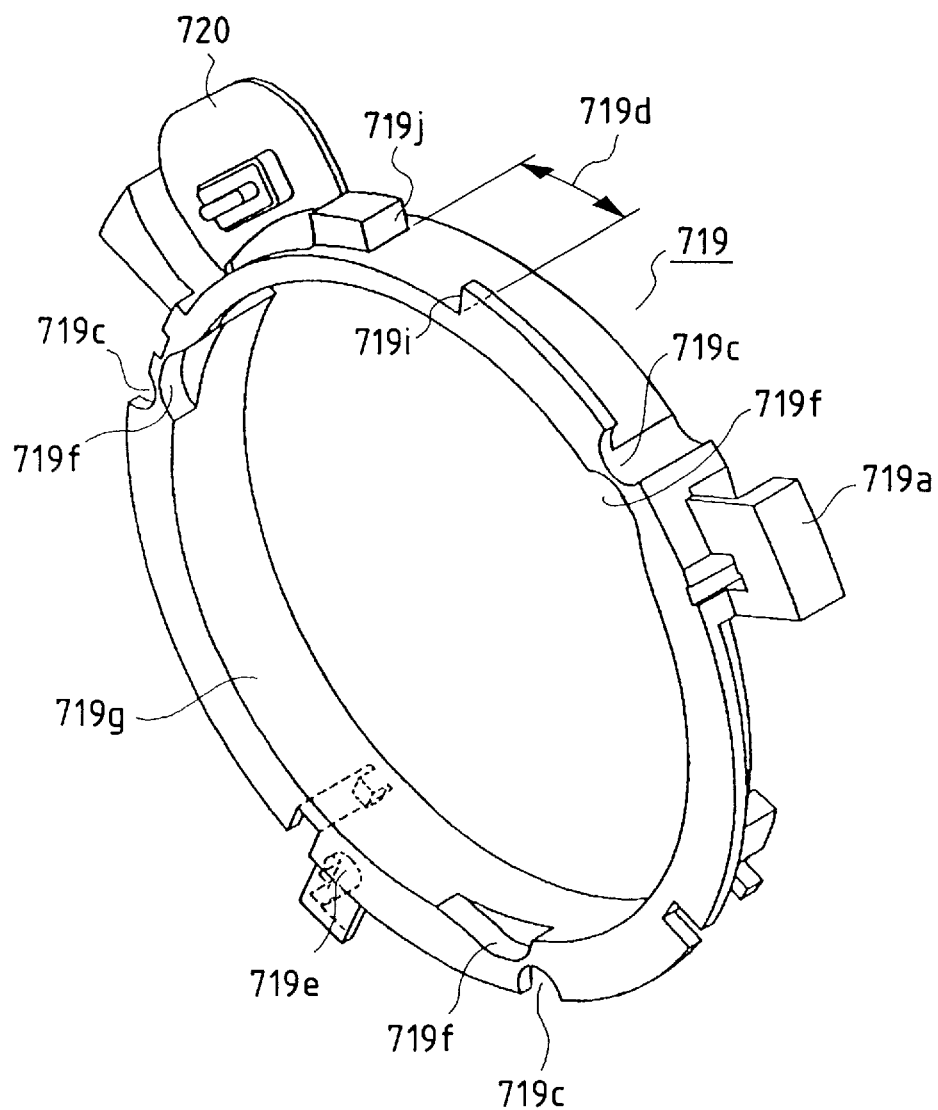
FIG. 8 is a partial perspective view of the lens barrel shown in FIG. 1.

FIG. 7 is a schematic view of the lens barrel after assembling, seen from the rear side in FIG. 1. A lock ring 719 is pushed into the base plate 71, with external notches 719*c*(provided in three positions in FIG. 8) of the lock ring 719 matched with internal projections 71*j* (in three positions) of the base plate 71, and the lock ring 719 is then rotated in an unlocking direction (counterclockwise in FIG. 7) to achieve bayonet coupling with the base plate 71, whereby the lock ring 719 is restricted in the axial direction with respect to the base plate 71 but is rendered rotatable about the optical axis.

An elastic locking rubber member (limiting member) 726 is provided on the base plate 71, in order to avoid bayonet uncoupling by the eventual rotation of the lock ring 719 to a position where the notches 719*c* match the projections 71*j*.

Consequently the lock ring 719 is rendered only rotatable within a range (angle $\theta_o$, of the notch 719d) limited by the lock rubber 726.

Without such lock rubber 726, the lock ring 719 is movable in a wider range with respect to the base plate 71, whereby the bayonet coupling may be made or released. However, with the lock rubber 726 for limiting the movable range with the angle $\theta_o$, the external notches 719c can no longer rotate to positions matching the internal projections 71j, whereby the bayonet coupling is maintained.

Figure 11:
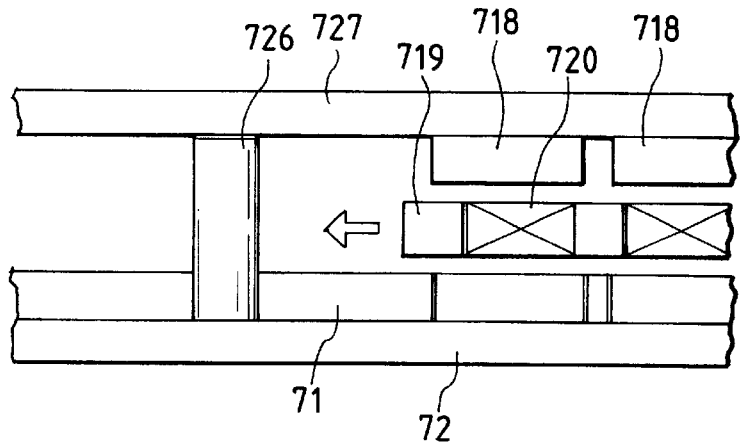
FIG. 11 is a partial cross-sectional view of the lens barrel shown in FIG. 1.

The lock rubber 726 is maintained in position by pressing into a hole (not shown) formed in the base plate 71, and is prevented from tumbling by surrounding about a half of the periphery with the rear protruding portion 71a of the base plate 71 and with a protruding portion around a screw hole (self tapping hole) 71L. Also the yoke 727 is screw coupled to the base plate 71 to sandwich the lock rubber 726 between the yoke 727 and the second yoke 72 as shown in FIG. 11 (schematic cross-sectional view along the circumferential direction of FIG. 7), in order to limit the elasticity of the lock rubber. In this manner the lock rubber 726 is fixed to the base plate 71 without the use of a screw or an adhesive material.

Figure 9:
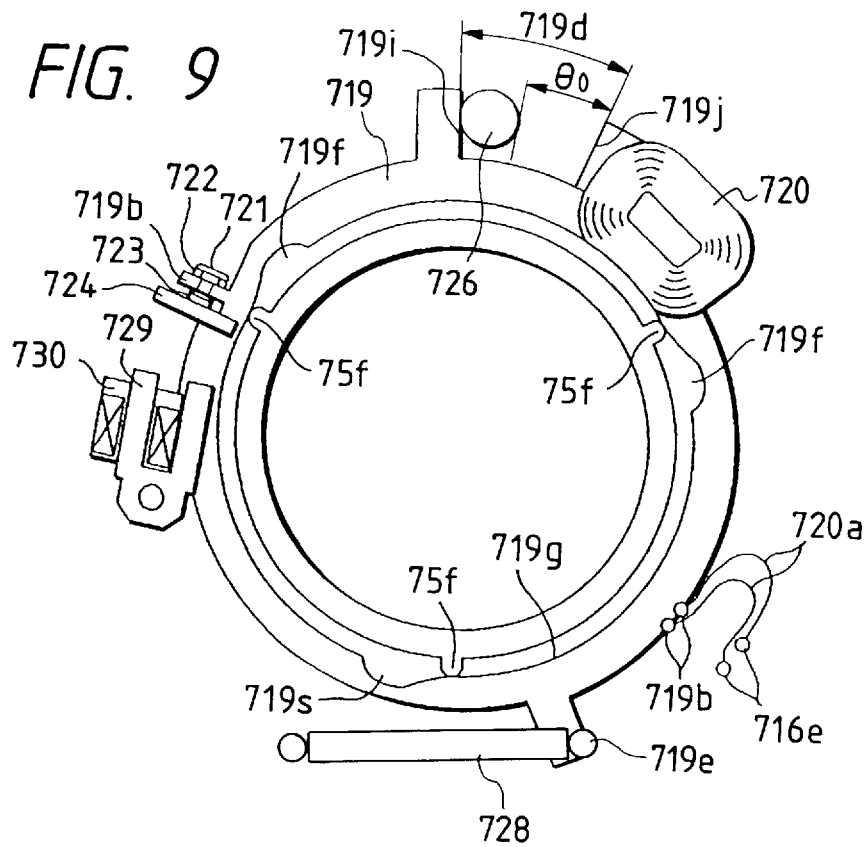
FIGS. 9 and 10 are partial plan views of the lens barrel shown in FIG. 1.
Figure 10:
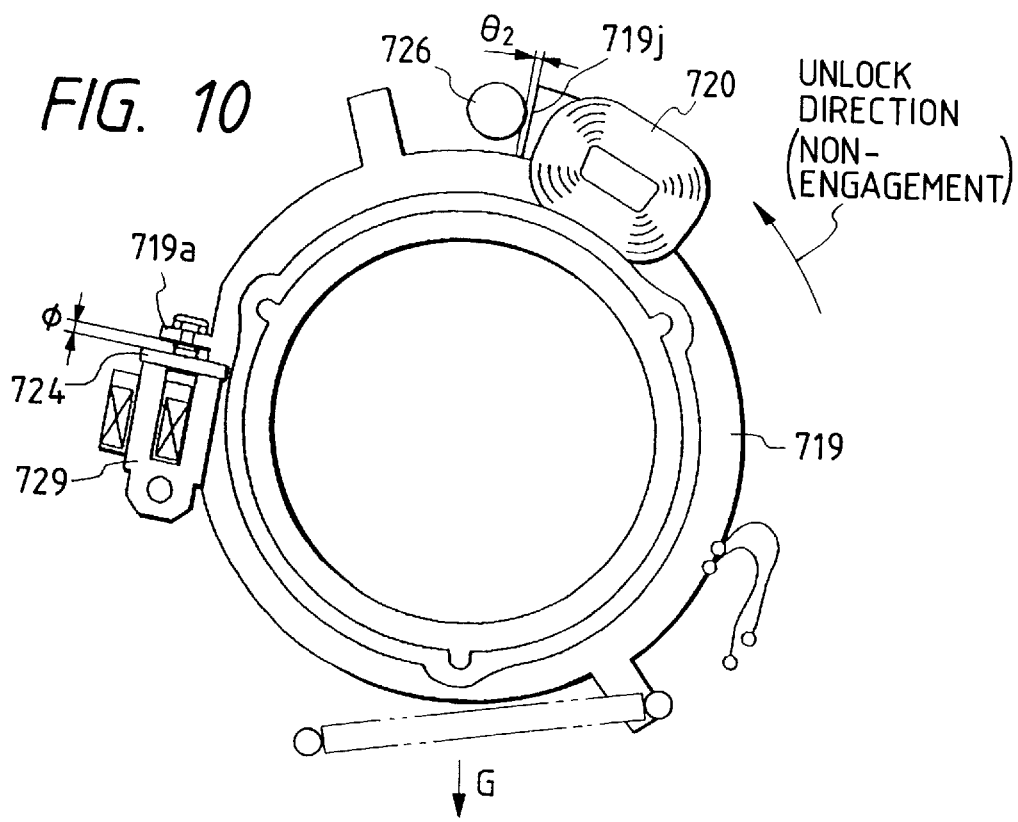

Now reference is made to FIGS. 9 and 10, for explaining the contacting relationship of the lock rubber 726 and the lock ring 719 and the movable range thereof. These drawings only show the principal parts extracted from the plan view in FIG. 7, and the shapes and the layouts of the parts are somewhat different from the actual assembled state for the purpose of clarity.

FIG. 9 is a plan view showing a locked state, wherein the lock ring 719 is clockwise biased by a lock spring 728, but is prevented from rotation by impingement of the lock rubber 726 with a side 719i of the lock ring 719. Such stopping of rotation of the lock ring 719 is achieved elastically, by the rubber member independent from the base plate 71, thereby absorbing the shock at the locking operation and avoiding noise generation. The contacting side 719i of the lock rubber 726 is provided in the vicinity of the coil 720, where the lock ring 719 has concentrated mass and has the largest inertia at the rotation thereof.

If the rotation is stopped at a portion of a hook 719e, which is distant from the coil 720, there will result a deformation in the lock ring 719, causing an unpleasant noise at the locking operation and eventually leading to detachment of the lock ring 719 from the base plate 71 (because of the snapped fitting). For these reasons, in the present invention, the stopping of rotation of the lock ring 719 is elastically made in the vicinity of the coil 720, namely with a shock absorbing effect and in a position with concentrated mass, thereby avoiding deformation of the lock ring 719 at the locking operation with low and agreeable locking noise.

The lock ring 719 is not detached from the base plate 71, since the bayonet coupling is relatively strong and the lock ring 719 is maintained from deformation. The lock ring 719 is driven in the locking and unlocking directions, and the noise when such drive is stopped is generated in both directions.

However, immediately before the end of drive in the unlocking directions, at first an armature 724 comes into contact with a weak force (by elastic force or an armature spring 723) with an attraction yoke 729, generating a low metallic sound, but the sound is not generated thereafter at the end of the drive, because of the elasticity of the armature spring 723. Also the above-mentioned metallic sound is not much disagreeable to the photographer, since it is generated in synchronization with the shutter releasing operation, when the image bur prevention system is activated. In this manner the noises at the locking operation are reduced.

In the present embodiment, as explained in the foregoing, the lock rubber 726 is so provided as to come into contact with the lock ring 719 in the vicinity of the coil 720. More specifically, in the present embodiment:

(A1) the lock ring 719 having a biasing spring in the locking direction is;

(A2) fitted into the base plate 71, with rotation in the locking (clockwise) direction; and (A3) is then rotated in the unlocking direction to form a bayonet coupling, which is secured with the lock rubber.

These three features provide the effects of:

(B1) stably coupling the lock ring to the base plate with a simple bayonet maintaining mechanism;

(B2) suppressing the noise at the locking operation; and (B3) avoiding deformation of the lock ring and unpleasant noise at the locking operation, by positioning the lock rubber in the vicinity of the coil.

The present invention is also featured by a fact that the lock rubber 726 also serves as a stopper at the unlocking operation of the lock ring 719.

FIG. 10 is a schematic view showing a state where the armature 724 comes into contact with the attraction yoke 729 by the rotation of the lock ring 719 in the unlocking direction. In this state there stands a relation:

$$\theta_2 < \phi$$

wherein $\theta_2$ is the clearance between the external periphery of the lock rubber 726 and the side 719i of the lock ring, and $\phi$ is the clearance between a lock ring projection 719a and the armature 724 (indicating a margin of drive for equalizing the armature 724 to the attraction yoke 729.)

Thus, without the side 719i, there stands a relation:
$$\theta_1 - \phi < \theta_o < \theta_1$$

wherein $\theta_1$ is the drive angle of the lock ring 719 from the state in FIG. 9 to that in FIG. 10 in which the drive margin is totally consumed.

Therefore, even if the lock ring 719 is still driven in the unlocking direction in the state shown in FIG. 10, the armature 724 is securely attracted by he attraction yoke 729, because the elastic contact of the lock rubber 726 with the side 719i takes place earlier than the contact of the lock ring projection 719a with the armature 724.

As explained in the foregoing, the stopper which limits the rotation in both directions, being composed of single elastic means and fixed in position by being sandwiched between the component parts and serving also maintaining the bayonet coupling, provides engagement means which is satisfactory in the assembling efficiency, free from unpleasant noise in the operation and stable and secure in the function.

Among the above-explained mechanisms in the lens barrel, the lens 74, the support frame 75, the coils 76p, 76y, the IRED's 77p, 77y, the support members 78a, 79b, the charge spring 710 and the support shaft 711 constitute optical support means (correction means) for decentralizing the optical axis, while the base plate 71, the second yoke 72, the permanent magnets 73 and the first yoke 712 constitute support means for supporting the correction means, and the permanent magnet 718, the lock ring 719, the coil spring 720, the armature shaft 721, the armature rubber 722, the armature spring 723, the armature 724, the yoke 727, the lock spring 728, the attraction yoke 729 and the attraction coil 730 constitute engagement means for stopping the correction means. Also the armature 724, the yoke 729 and the coil 730 constitute a support unit, and the armature shaft 721, the armature rubber 722 and the armature spring 723 constitute equalizing means.

Now, again referring to FIG. 1, the hard circuit board 715 is provided thereon with IC's 731p, 731y for respectively amplifying the outputs of the position detection elements 78p, 78y. The internal structure of such IC is shown in FIG. 12 (IC 731p alone being illustrated, since 731y is of a same structure).

Figure 12:
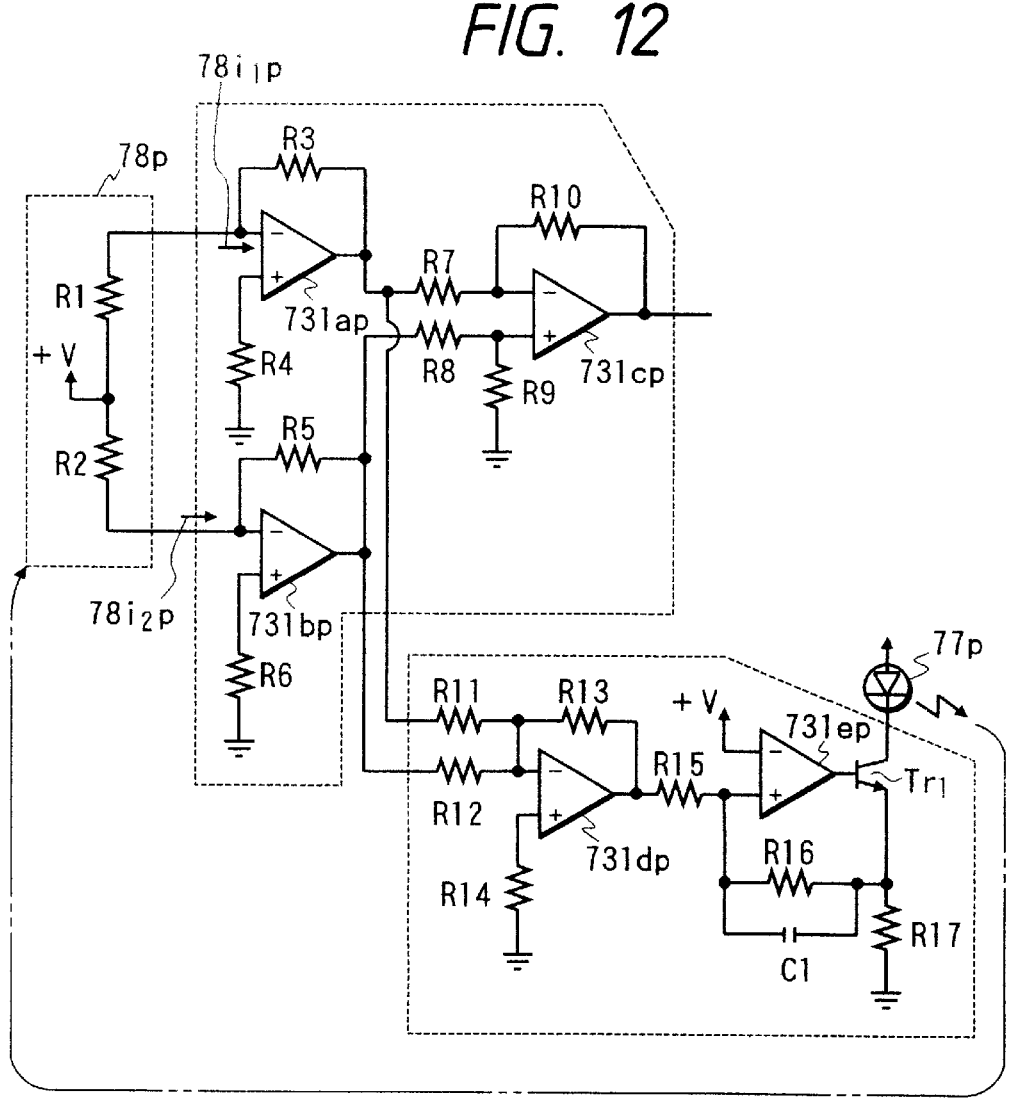
FIG. 12 is a circuit diagram showing a part of the circuit provided on a circuit board shown in FIG. 1.

Referring to FIG. 12, current-voltage converting amplifiers 731ap, 731bp convert photocurrents $78_{i1p}$, $78_{i2p}$ generated in the position detection element 78p (consisting of resistors R1, R2) by the light from a light-emitting element 77p, into voltages, and a differential amplifier 731cp amplifies the difference of the outputs of the current-voltage converting amplifiers 731ap, 731bp.

As explained in the foregoing, the lights from the light emitting elements 77p, 77y enter the position detection elements 78p, 78y respectively through the slits 75ap, 75ay, and the entering positions on the elements 78p, 78y vary with the movement of the support frame 75 in the plane perpendicular to the optical axis. The position detection element 78p has sensitivity in a direction 78ap, while the slit 75ap is formed so as to expand the light beam in a direction perpendicular to 78ay but limit the light beam in a direction 78ap.

Therefore, the balance of the photocurrents $78_{i1p}$ and $78_{i2p}$ of the position detection element 78p varies only when the support frame 75 moves in a direction 713p, whereby the differential amplifier 731cp provides an output corresponding to the movement of the support frame 75 in the direction 731p. Also the position detection element 78y has sensitivity in a direction 78ay, while the slit 75ay is extended in a direction 78ap perpendicular to 78ay, so that the outputs of the position detection element 78y vary only when the support frame 75 moves in a direction 713y.

An adding amplifier 731dp provides the sum of the outputs of the current-voltage converting amplifiers 731ap, 731bp (i.e. the total light amount received by the position detection element 78p), and in response a drive amplifier 731ap drives the light-emitting element 77p.

As the above-mentioned light-emitting element 77p quite unstably varies the amount of emitted light, for example depending on the temperature, the absolute amount ($78_{i1p}$+$78_{i2p}$) of the photocurrents $78_{i1p}$, $78_{i2p}$ of the position detection elements 78p, 78y also varies likewise. Consequently, the output ($78_{i1p}$–$78_{i2p}$) of the differential amplifier 731cp, indicating the position of the support frame 75, also varies.

For this reason, the light emitting element 77p is so controlled by the above-explained drive circuit so as to maintain a constant total received light amount, thereby avoiding the variation in the output of the differential amplifier 731cp.

The coils 76p, 76y shown in FIG. 1 is positioned in a closed magnetic circuit formed by the permanent magnet 73, the first yoke 712 and the second yoke 72, whereby a current supply to the coil 76p moves the support frame 75 in a direction 713p (according to already known Fleming's left hand rule), while a current supply to the coil 76y moves the support frame 75 in a direction 713y.

In short, the outputs of the position detection elements 77p, 77y are amplified by the IC's 731p, 731y and the coils 76p, 76y are driven with the obtained outputs to move the support frame 75, whereby the outputs of the position detection elements 78p, 78y are varied. By setting the driving direction (polarity) of the coils 76p, 76y in such a manner as to reduce the outputs of the position detection elements 78p, 78y (negative feedback), the support frame 75 becomes stabilized by the driving force of the coils 76p, 76y at a position where the outputs of the position detection elements 78p, 78y are almost zero.

In such driving method (hereinafter called position control method) with negative feedback of the outputs of the position detection elements 78p, 78y, by supplying the IC 731p, 731y with a target value (for example hand fluctuation angular signal) from the outside, the support frame 75 is extremely faithfully driven according to such target value.

In practice the outputs of the differential amplifiers 731cp, $73^1$cy are supplied through the flexible circuit board 716 to an unrepresented main circuit board, subjected therein to A/D conversion and fetched in a microcomputer. In the microcomputer, the signals are amplified with comparison with target values (hard fluctuation angular signal), then subjected to digital phase advancement compensation (for stabilizing the position control) and supplied, again through the flexible circuit board 716, to IC 732 for driving the coils 76p, 76y.

Based on the entered signals, the IC 732 effects PWM (pulse width modulation) drive of the coils 76p, 76y, thereby driving the support frame 75. The support frame 75 is rendered slidable in directions 713p and 713y, and is stabilized in position by the above-explained position control method. In a consumer optical equipment such as a camera, the support frame 75 is not always driven, in consideration of the consumption of power supply. Since the support frame 75 becomes, in the uncontrolled state, freely movable in the plane perpendicular to the optical axis, the following measures are taken for preventing noise generation or damage at the end of stroke in such movement.

As shown in FIGS. 6 to 10, the support frame 75 is provided on the rear face thereof with three radial projections 75f, of which ends fit in the internal periphery of the lock ring 719 as shown in FIG. 7 or 9, whereby the support frame 75 is restricted in all the directions with respect to the base plate 71.

Figure 13:
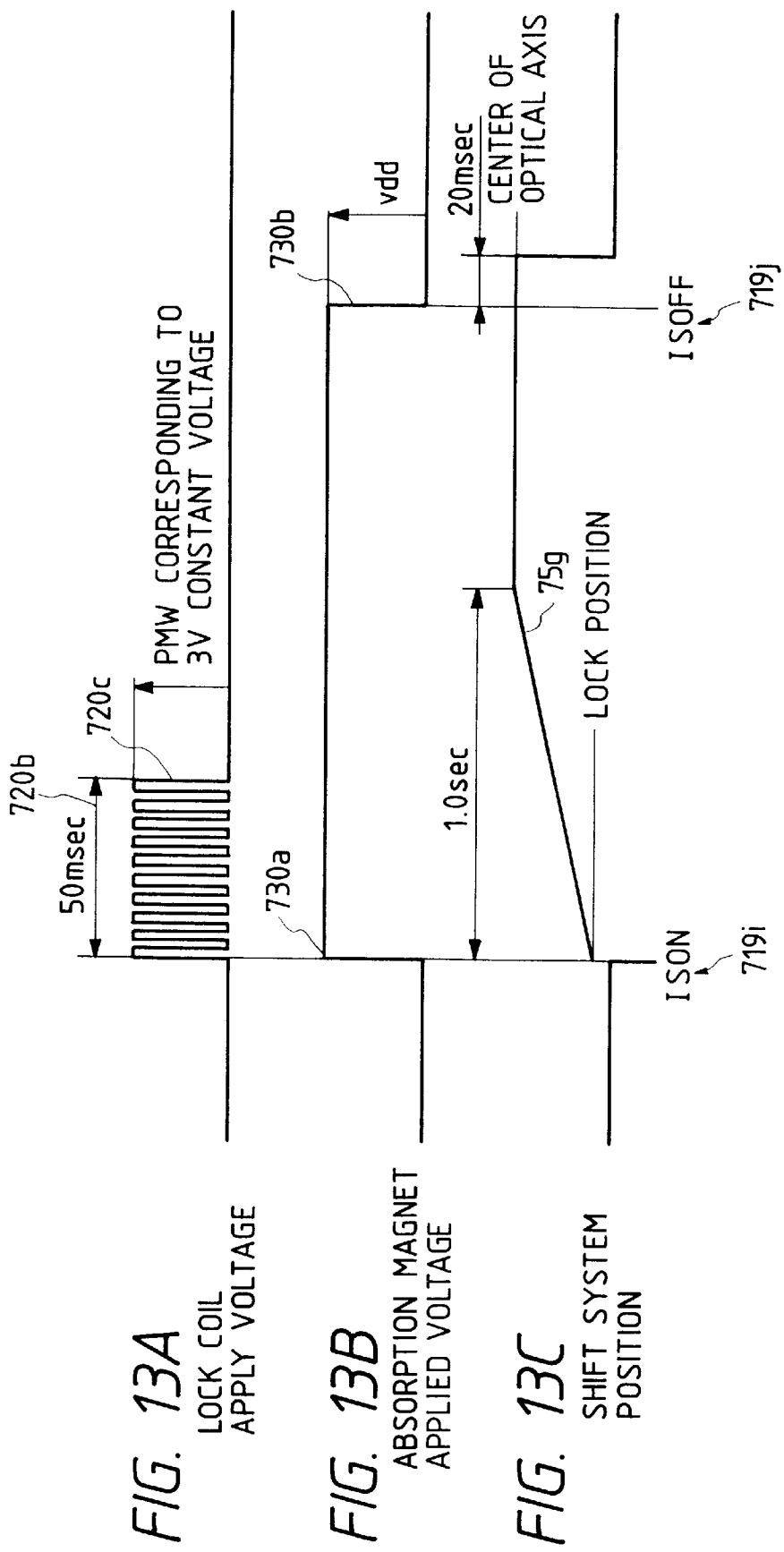
FIGS. 13A to 13C are timing charts showing the function of the embodiment 1 of the present invention.

FIGS. 13A to 13C are timing charts showing the mechanical lock ring drive. At a timing 719i, the coil 720 is energized (PWM drive 720b) and also the attraction solenoid 730 is energized (730a), whereby the armature 724 is attracted by the attraction yoke 729, when the armature 724 impinges on the attraction yoke 729.

Then, at a timing 720c, the coil 720 is deactivated whereupon the lock ring 719 tends to rotate clockwise by the force of the lock spring 728, but the rotation is stopped because of the above-mentioned attraction of the armature 724 by the attraction yoke 729. In this state the projection 75f of the support frame 75 is opposed to a cam 719f, because of the rotation thereof, so that the support frame is rendered movable within a clearance between the projection 75f and the cam 719f.

Consequently the support frame 75 tends to drop in the direction of gravity G, but such dropping does not take place since the support frame 75 enters the controlled state at a timing 719i. In the uncontrolled state, the support frame 75 is restricted by the internal periphery of the lock ring 719, but in fact has a play corresponding to the fitting play between the projections 75f and the internal periphery 719g. Consequently the support frame 75 is displaced downwards by such play in the direction of gravity, so that the center thereof is displaced from that of the base plate 71. For this reason, for example for a period of 1 second from the timing 719i, there is executed control to return the center of the support frame 75 to that of the base plate (optical center).

Such slow control is adopted because the photographer can feel the fluctuation of the image through the lens 74 if a rapid movement to the center is conducted, and in order to avoid deterioration of the image by the movement of the support frame 75 in case an exposure operation is conducted in the course of such control. (For example the support frame 75 is moved by 5 µm during ⅛ seconds.)

More specifically the outputs of the position detection elements 78p, 78y at the timing 719i are memorized, and the control of the support frame 75 is started with such memorized values as target values, and then the support frame 75 is moved, in the course of 1 second, to a predetermined target value corresponding to the optical center. After the lock ring 719 is rotated to the unlocked state, the support frame 75 is driven also based on the target value from the fluctuation detection means, in superposition with the above-mentioned movement of the support frame to the center, thereby initiating the image blur prevention operation.

When the image blur prevention is turned off at a timing 719j, whereupon the target value is no longer entered from the fluctuation detection means to the main apparatus, so that the support frame 75 is so controlled to stop at the central position. In this state the attraction coil 730 is deactivated (730b), whereby the attraction yoke 730 loses the attracting force to the armature 724 and the lock ring 719 is clockwise rotated by the lock spring 728 and returns to the state shown in FIG. 9. Thereafter (for example after 20 msec), the control of the apparatus is terminated, whereby the timing chart shown in FIGS. 13A to 13C comes to the end.

Figure 14:
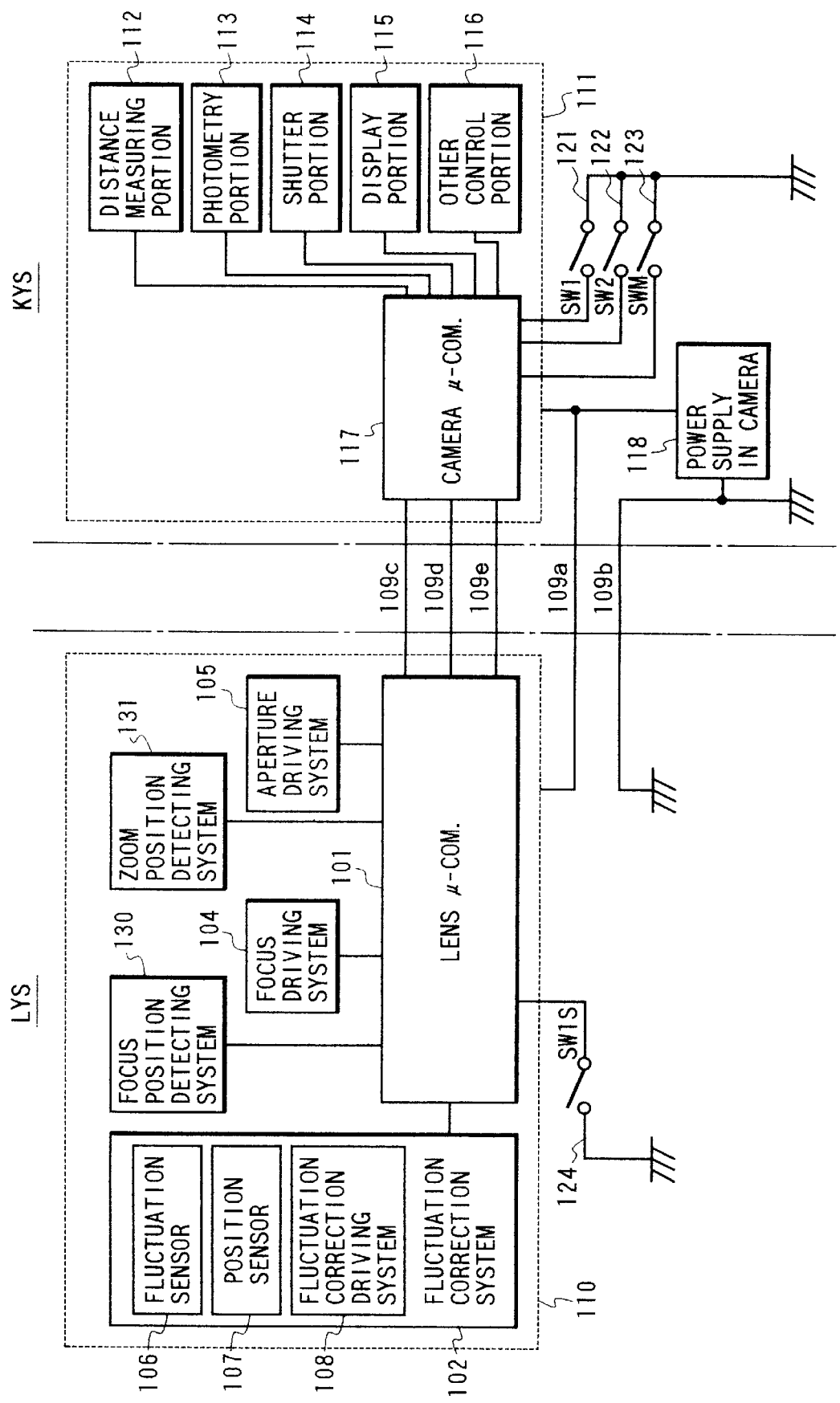
FIG. 14 is a schematic block diagram of the lens barrel and the camera in the embodiment 1 of the present invention.

FIG. 14 is a schematic block diagram of the embodiment 1 of the present invention applied to an optical equipment, which is a single-lens reflex camera. In FIG. 14 there are shown a lens barrel LYS and a camera body KYS. A microcomputer (lens microcomputer) 101, provided in the lens barrel and having control means and alteration means, receives communication from the camera body through contacts 109c (for clock signals) and 109d (for signal transmission from camera body to lens), and executes operations in a fluctuation correction system (fluctuation detection means) 102, a focus drive system 104 and a diaphragm drive system 105 and also controls the fluctuation correction system 102.

The fluctuation correction system 102 is composed of a fluctuation sensor 106 for detecting the fluctuation, a position sensor 107 for detecting the displacement of the correction lens, and a fluctuation correcting drive system 108 for effecting image blur prevention by driving the correction lens based on a control signal, calculated in the lens microcomputer 101, from the outputs of the fluctuation sensor 106 and the position sensor 107.

An image blur prevention switch 124 (SWIS) is turned on when the image blur preventing operation is selected.

The aforementioned focus drive system 104 drives a focusing lens to achieve focusing, according to an instruction from the lens microcomputer 101. Also the diaphragm drive system 105 closes the diaphragm to a set position or returns it to a fully open state, according to an instruction from the lens microcomputer 101.

A focus position detection system 130 detects the focus position, and a zoom position detection system 131 detects the zoom position.

The lens microcomputer 101 also transmits the in-lens status (zoom position, focus position, diaphragm aperture etc.) and the information on the lens (fully-open aperture, focal length, data required for distance calculation etc.) to the camera body through a communication contact 109e for signal transmission from the lens to the camera body.

The lens microcomputer 101, the image blur correction system 102, the focus drive system 104 and the diaphragm drive system 105 constitute a lens electrical system, which is powered from a power source 118 of the camera body, through a contact 109a and a ground contact 109b.

In the camera body, there is provided a camera body electrical system 111, which is composed of a distance measuring unit 112, a photometry unit 113, a shutter unit 114, a display unit 115, and an other control unit 116 and a camera microcomputer 117 for controlling these units and also executing exposure calculation and distance calculation. The camera body electrical system is also powered by the power source 118 in the camera body.

There are also provided a switch 121 (SW1) for initiating the photometry and the distance measurement and a switch 122 (SW2) for initiating the shutter releasing operation. These switches are generally formed as two-stroke switches, wherein the SW1 is closed by the depression of a shutter release button by a first stroke and the SW2 is closed by the depression of the shutter release button by a second stroke. There is also provided an exposure mode selection switch 123 (SWM), and the change of the exposure mode is achieved either by the on-off operation of the above-mentioned switch or by a simultaneous operation of the switch 123 and another operation member.

Figure 15:
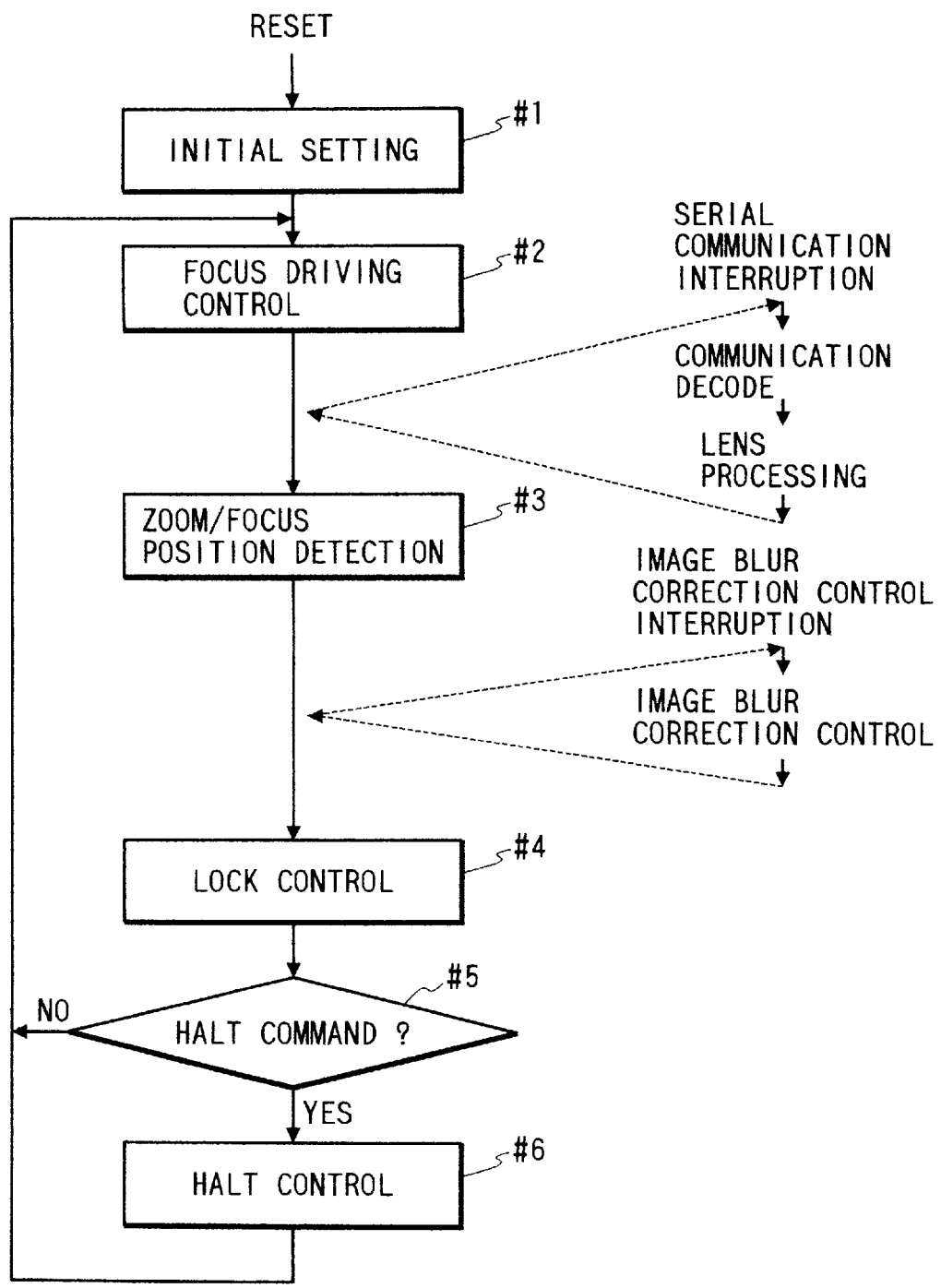
FIGS. 15, 16 and 17 (which is comprised of FIGS. 17A and 17B) are flow charts showing the function of the embodiment 1 of the present invention.

In the following there will be explained operations on an interchangeable lens in the above-explained camera. The lens microcomputer 101 executes the above-explained lens control, according to a flow chart shown in FIG. 15, according to which the functions will be explained in the following. When an operation, such as closing of the switch SW1, is conducted on the camera body, there is made a communication from the camera body to the lens, whereby the lens microcomputer 101 starts the control sequence from a step #1:

[Step #1] effects initialization for the lens control and the fluctuation correction control, including the start of a timer to be explained later.

[Step #2] causes the focus drive system 104 to effect focusing according to the instruction from the camera body.

[Step #3] causes the zoom position detection system 131 and the focus position detection system 130 to effect the detection of the zoom/focus positions.

[Step #4] effects lock/unlock control of the image blur correction system 102, according to the communication from the camera body and the status of the switch SWIS.

[Step #5] discriminates whether a HALT instruction (for stopping all the actuators in the lens) has been received from the camera body.

[Step #6] executes HALT control by terminating all the drives and putting the microcomputer in a sleeping state.

If an interruption process for the serial communication or the image blur correction control is requested by a communication from the camera body in the course of these steps, such interruption process is executed. The interruption process for the serial communication is for decoding of the communication data or for a lens process such as the diaphragm drive. The decoding of the communication data allows to identify, for example, the closing of the SW1 or SW2, the shutter speed and the kind of the camera body.

In the following there will be explained, according to a flow chart in FIG. 16, the lock/unlock operations of the fluctuation correction system 102. The fluctuation correcting operation is started when a main switch of the camera body and the switches SW1 or SWIS are all turned on:

[Step #31] discriminates whether the main switch of the camera body is turned on.

[Step #32] discriminates whether the switch SW1 of the camera body is turned on.

[Step #33] discriminates whether the switch SWIS is turned on. If it is on, the main switch, SW1 and SWIS are all on in the camera body, so that an image blur correction starting operation is executed from a step #34. On the other hand, if any of the above-mentioned switches is off, an image blur correction ending operation is executed from a step #40.

[Step #34] sets an image blur correction start flag IS_START, corresponding to a starting operation control.

[Step #35] energizes the coil 730 of the unlock solenoid, in order to maintain the lock ring 719 in a rotated state against the force of the lock spring (lock released state) as explained before.

[Step #36] energizes image blur correction coils 76p, 76y.

[Step #37] energizes the lock ring drive coil 720 to rotate the lock ring 719.

[Step #38] discriminates whether the drive time of the lock ring 719 has elapsed. This drive time is set in advance, for maintaining the lock released state by the unlock attraction solenoid, after the rotation of the lock ring 719 is terminated in the step #39.

[Step #39] terminates the energization of the lock ring drive coil 720, thereby realizing the lock released state. The steps #35 to #39 correspond to a first starting operation.

[Step #40] clears the image blur correction start flag.

[Step #41] terminates the energization of the coil 730 of the unlock attraction solenoid, whereby the lock ring rotates in the locking direction by the lock spring, thereby realizing a locked state.

[Step #42] terminates also the energization of the lock ring drive coil, as it may be turned off in the course of drive of the lock ring 719.

[Step #43] discriminates whether the centering operation, for bringing the correction lens to the central position, has been terminated.

[Step #44] terminates the energization of the image blur correction coils 76p, 76y, as the correction lens is already in the central position.

Figure 17B:
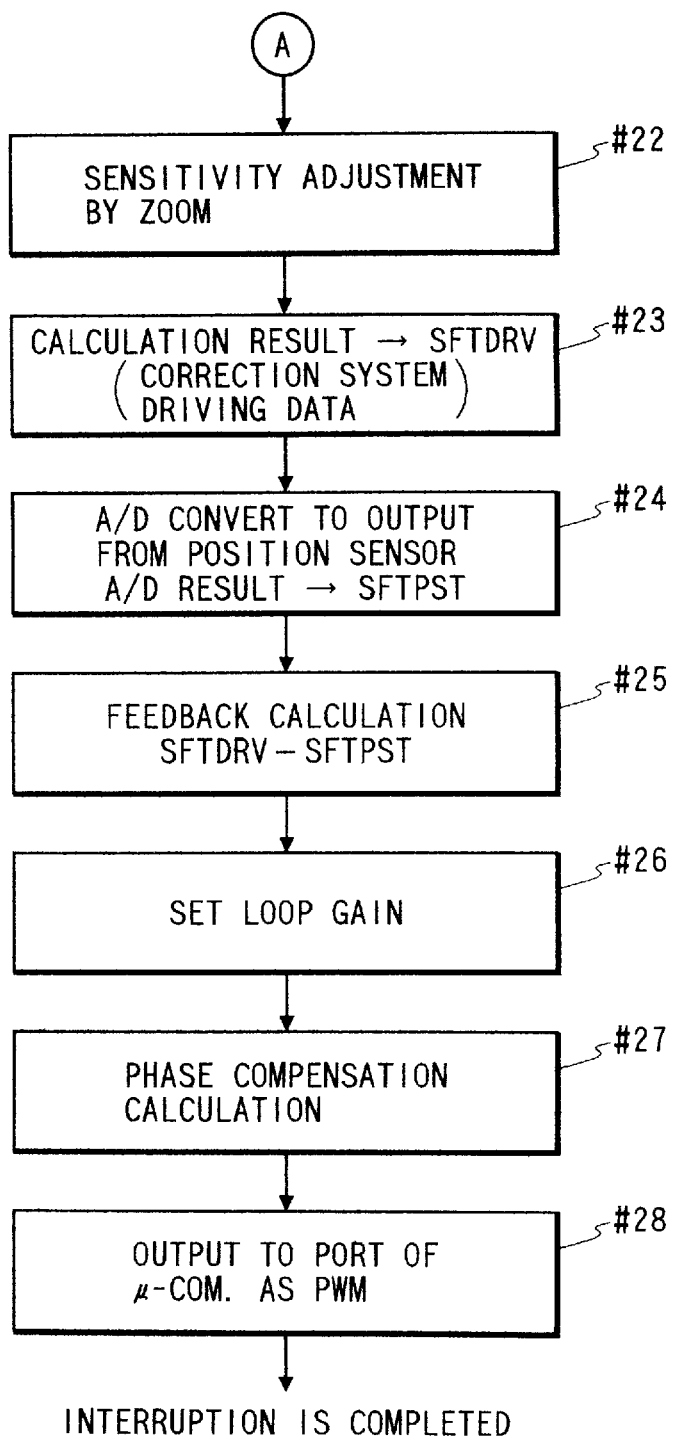

The lock/unlock operation is executed in the above-explained manner. FIGS. 17A and 17B show interruption processes for the image blur correction, which is a timer interruption process generated at a constant interval. When an interruption process for the image blur correction is generated in the course of the main operation of the camera, the lens microcomputer 101 starts the image blur correction control from a step #11 in FIG. 17A.

[Step #11] fetches the output of the fluctuation sensor 106 which is an angular velocity sensor and effects A/D conversion.

Figure 16:
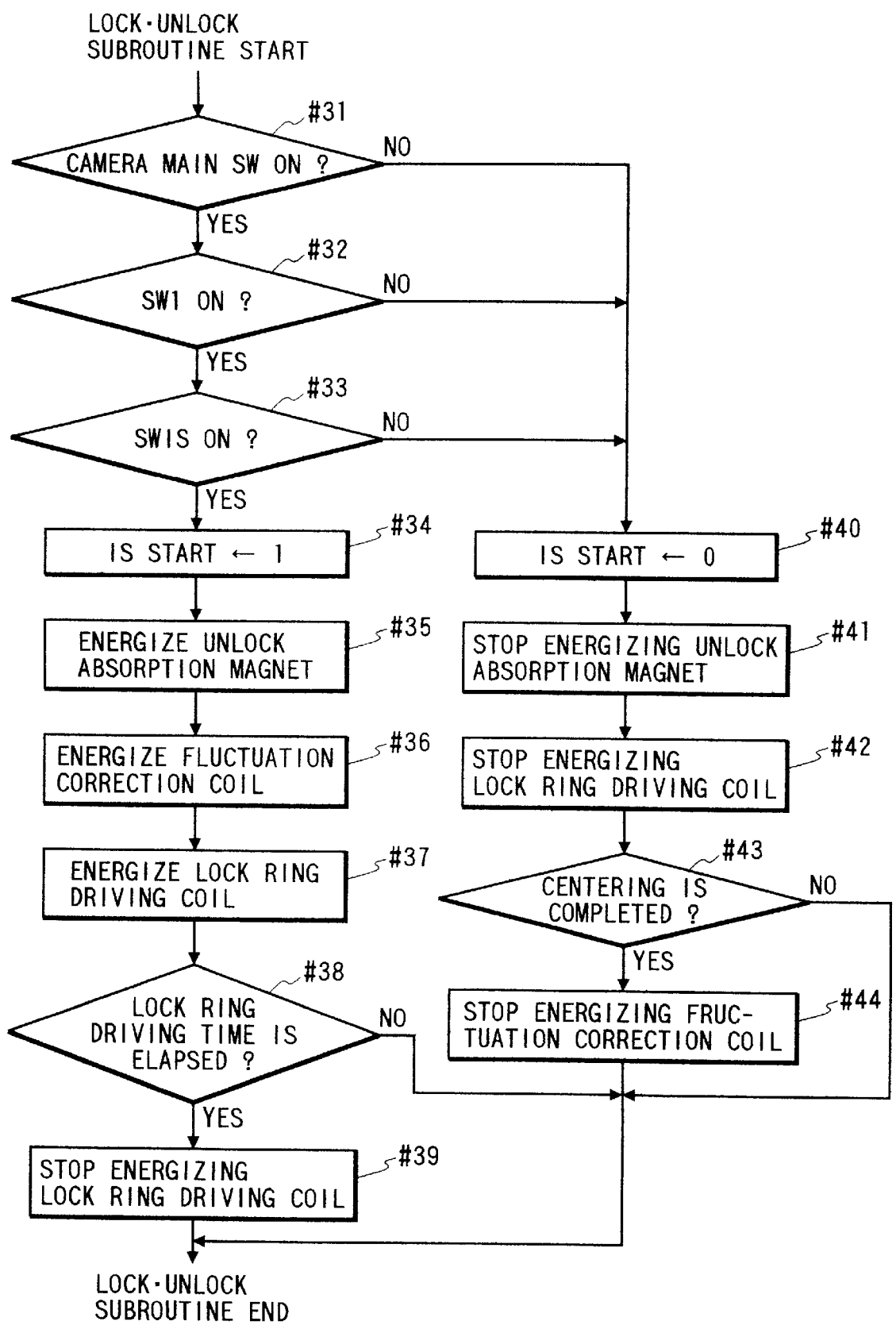

[Step #12] discriminates the state of the image blur correction start flag IS_START, which is set in the lock/unlock subroutine shown in FIG. 16. The sequence proceeds to a step #15 or #13, respectively if the flag is set at 1 or not. Steps #13 and #14 are operations when the image blur correction is not executed.

[Step #13] initializes the DC offset and the integration. As a result, the drive signal assumes a state 0, and the fluctuation correction system 102 is maintained at the central position.

[Step #14] clears a timer for measuring the time after the reception of the image blur correction start command.

[Step #15] discriminates whether 1 second has elapsed since the reception of the image blur correction start command, and the sequence proceeds to a step #17 or #16 respectively if 1 second has elapsed or not.

[Step #16] discriminates whether the A/D converted value, obtained in the step #11 exceeds a predetermined range LVL. If the range is exceeded, the sequence returns to the initial state in the step #13 to repeat the DC offset calculation from the beginning, but if not exceeded, the sequence proceeds to a step #17. The discrimination in the step #16 judges whether the DC offsetting has been made appropriately.

[Step #17] discriminates whether 400 msec has elapsed since the reception of the image blur correction start command, and, if elapsed, the sequence proceeds to a step #20 to initiate the image blur correction operation, but, if not, the sequence proceeds to a step #18. Steps #18 and #19 are executed during 400 msec after the start of the image blur correction.

[Step #18] calculates the, DC offset, by a low-pass filter calculation for example with a cut-off frequency of 10 Hz, in order to eliminate the hand fluctuation component.

[Step #19] initializes the high-pass filter calculation, to shift the result of integration to 0. This zero signal is used as the drive signal to maintain the fluctuation correction system 102 at the central position. The steps #17 to #19 correspond to a second starting operation.

The sequence after a step #20 is the image blur correcting operation.

[Step #20] effects a high-pass filter calculation, utilizing the DC offset determined in the step #18.

[Step #21] effects integration, of which result indicates the angular displacement.

[Step #22] adjusts the eccentricity (sensitivity) of the correction lens to the fluctuation angular displacement, depending on the zoom/focus position.

[Step #23] stores the result of calculation (image blur correction drive data) in a RAM area set by SFTDRV of the microcomputer.

[Step #24] effects A/D conversion of the output of the position sensor, detecting the position of the correction lens, and stores the result of conversion in SFTPST in the RAM.

[Step #25] effects a feedback calculation (SFTDRV–SFTPST).

[Step #26] multiplies the result of calculation of the step #25 with a loop gain.

[Step #27] effects a phase compensating calculation in order to obtain a stable control system.

[Step #28] releases the result of the step #27 with PWM to the correction lens coil driver through a port of the microcomputer, thereby driving the correction lens and correcting the image blur. The interruption process is thus terminated.

As explained in the foregoing, the step #16 discriminates whether the signal of a large amplitude has been entered, and, if such large-amplitude signal is entered within a predetermined time (1 sec) after the start of the image blur correction, the calculation of the DC offset is repeated again. (In the flow charts shown in FIGS. 17A and 17B, the DC offset calculation is conducted in the step #18 during a period of 400 msec, after which the sequence is terminated, but, if the timer is cleared to 0 again in the step #14, the DC offset calculation in #18 is executed again.) Consequently there is reduced error between the calculated DC offset and the actual DC offset, and there can thus be suppressed the transient response which is generated in the case where the image blur correction is started while the camera is in a large swinging motion such as panning.

In case the sequence proceeds to the step #14 or #19, the result of integration is 0, so that, even after execution of the steps #22 to #27, the output in the step #28 is also 0. Consequently, in the flow charts in FIGS. 17A and 17B, the sequence proceeds to the step #22 after the step #14 or #19, but the sequence may be modified so as to proceed directly to the step #28 from the step #14 or #19.

Also in the flow charts in FIGS. 18A and 18B showing the function of a second embodiment to be explained later, the sequence may be modified, for the same reason, to so as to proceed directly to the step #28 after the step #14.

When the conditions for starting the image blur correction are met, the lock state is released and the correction drive system is energized. If the DC offset calculation is repeated because of the input of a large fluctuation in such state, the correction lens is maintained at the central position in the step #19 and the lock means remains in the released state, so that the image blur correction can be started immediately.

Also after the DC offset calculation, the image blur correcting operation is started based on the result of detection of fluctuation, so that the image blur correction remains active even during the function of the discrimination means. Consequently the start of the image blur correction is not delayed by the time required for the discriminating operation of the discrimination means.

In the following there will be explained a second embodiment of the present invention, which effects releasing of the locked state and energization of the fluctuation correction drive system in response to the image blur correction start command, then discriminates the entry of a large fluctuation during a predetermined period (800 msec), and, if not entered, initiates the image blur correction based on the result of detection of fluctuation.

Figure 20:
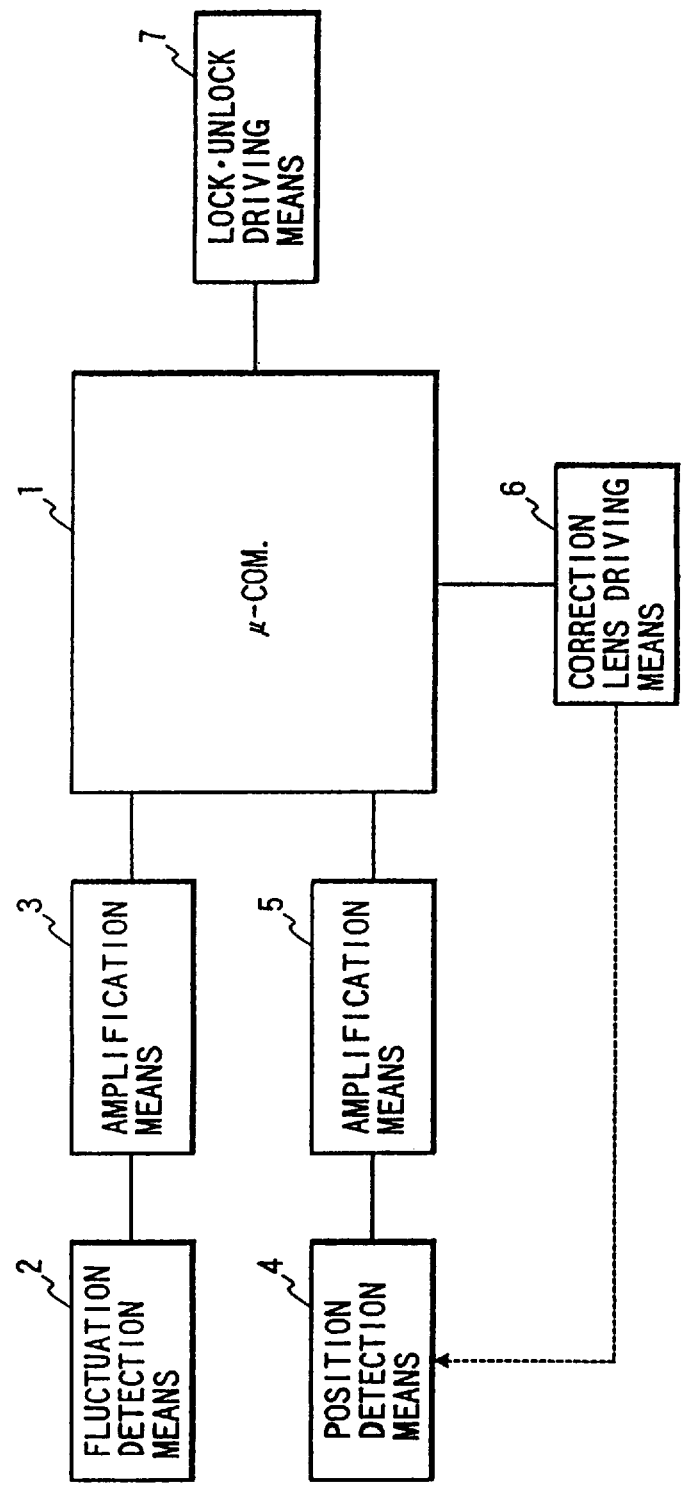
FIG. 20 is a schematic block diagram of a conventional image blur correction system.

FIGS. 18A and 18B are flow charts showing the above-explained operations, wherein parts same as those in the first embodiment will not be explained further. The lock/unlock operation is similar to that shown in FIG. 20. A step #15 discriminates whether 800 msec has elapsed after the setting of the fluctuation correction start flag IS_START, and, if not, a step #16 discriminates, by discrimination means, whether the A/D converted value exceeds a predetermined level. If not, a step #17 effects the DC offset calculation, but, if exceeded, the sequence returns to the step #13 to repeat the DC offset calculation from the beginning. In this manner the releasing of the locked state and the DC offset calculation are conducted in response to the image blur correction start command, and there is discriminated whether a large fluctuation has been entered until the lapse of a predetermined time, and, if entered, the DC offset calculation is repeated from the beginning but, if not entered, the image blur correction is started based on the result of detection of the fluctuation. Consequently there is reduced the error between the calculated DC offset and the actual DC offset, and there can thus be suppressed the transient response which is generated in the case where the image blue correction is started while the camera is in a large swinging motion.

Figure 22A:
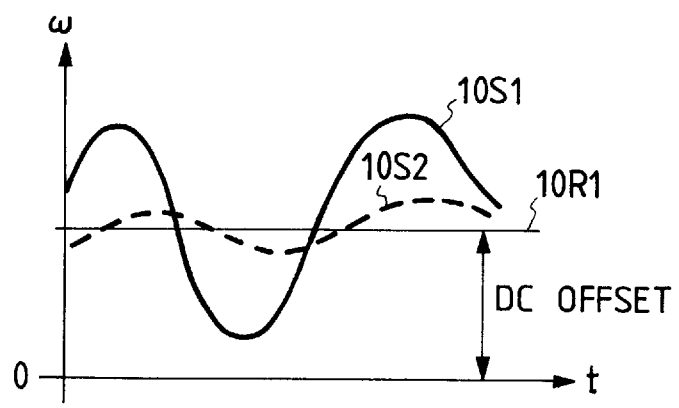
FIGS. 22A and 22B are charts showing the relationship between a signal obtained by the image blur detection means and a DC offset.
Figure 22B:
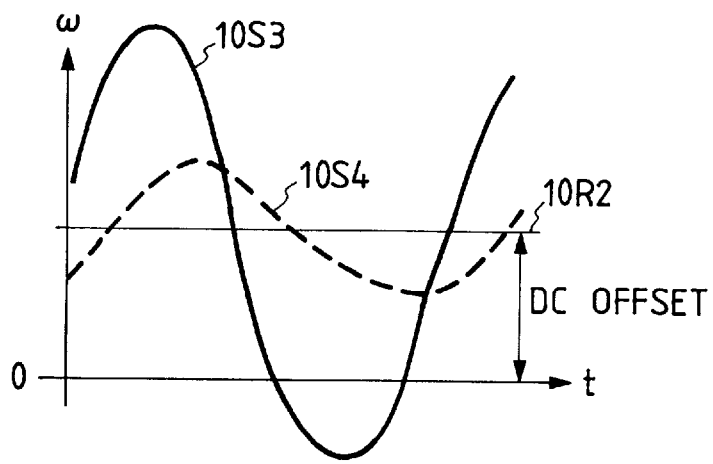

Also in case the DC offset calculation is repeated because of the entry of a large fluctuation, the correction lens is maintained at the central position and the lock means is maintained in the released state, so that the image blur correction can be started immediately after the DC offset calculation. In FIG. 22, the steps #17 and #18 correspond to the first starting operation, and the steps after the #20 correspond to the second starting operation.

In the foregoing embodiments there have been explained digital control, but there may also be conducted analog control. Also the image blur prevention apparatus may be provided, instead of being incorporated in the interchangeable lens as in the foregoing embodiments, in an adapter to be positioned between the lens and the camera, such as an extender, or in an accessory to be attached in front of the interchangeable lens, such as a conversion lens.

It may further be applied to other cameras such as a lens-shuttered camera or a video camera, or to other optical instruments or components thereof.

Furthermore, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Also the individual components shown in schematic or block form in the drawings are all well-known in the camera arts and their specific construction and operation are not critical to the operation or best mode for carrying out the invention.

Furthermore, the foregoing embodiments or the technical components thereof may be used in combination to realize the present invention. Also in the foregoing embodiments, the angular velocity sensor is employed for the fluctuation sensor, but there may be employed any other sensors capable of detecting fluctuation, such as an angular acceleration sensor, an acceleration sensor, a velocity sensor, an angular displacement sensor, a displacement sensor or a method of detecting the image blur itself.

What is claimed is:

1. An apparatus adapted for image blur prevention comprising:

a fluctuation sensor that detects a fluctuation and generates an output;

DC component detecting means for detecting a DC component included in the output of said fluctuation sensor;

a timer that counts time from a start of operation of said fluctuation sensor;

judging means for judging whether the output of said fluctuation sensor exceeds a predetermined level during a predetermined period of time from the start of counting by said timer; and cancelling means for cancelling the DC component when said judging means judges that the output of said fluctuation sensor exceeds the predetermined level.

2. An apparatus according to claim 1, further comprising:

A/D converting means for converting the output of said fluctuation sensor, said judging means judging whether an output signal of said A/D converting means exceeds a predetermined level.

3. An apparatus according to claim 1, wherein said DC component detecting means performs a low-pass filter calculating of the output of said fluctuation sensor to detect the DC component.

4. An apparatus according to claim 1, wherein the predetermined period of time counted by said timer is longer than a time needed for said DC component detecting means to detect the DC component.

5. An apparatus according to claim 1, wherein said timer is cleared when said judging means judges that the output of said fluctuation sensor exceeds a predetermined level.

6. An apparatus adapted for image blur prevention, comprising:

a fluctuation sensor that detects a fluctuation and generates an output;

DC component detecting means for detecting a DC component included in the output of said fluctuation sensor;

a timer that counts time from a start of operation of said fluctuation sensor;

judging means for judging whether the output of said fluctuation sensor exceeds a predetermined level during a predetermined period of time from a start of counting by said timer; and control means for controlling said DC component detecting means so as repeat a detection operation of the DC component detecting means when said judging means judges that the output of said fluctuation sensor exceeds the predetermined level.

7. An apparatus according to claim 6, further comprising:
A/D converting means for converting the output of said fluctuation sensor, said judging means judging whether an output signal of said A/D converting means exceeds a predetermined level.

8. An apparatus according to claim 6, wherein said DC component detecting means performs a low-pass filter calculation of the output of said fluctuation sensor to detect the DC component.

9. An apparatus according to claim 6, wherein the predetermined period of time counted by said timer is longer than a time needed for said DC component detecting means to detect the DC component.

10. An apparatus according to claim 6, wherein said timer is cleared when said judging means judges that the output of said fluctuation sensor exceeds a predetermined level.

* * * * *

UNITED STATES PATENT AND TRADEMARK OFFICE
CERTIFICATE OF CORRECTION

PATENT NO.   : 5,881,324
DATED        : March 9, 1999
INVENTOR(S)  : SHINJI IMADA It is certified that error appears in the above-identified patent and that said Letters Patent is hereby corrected as shown below:

Drawings:
SHEET 13

Figure 16, "FRUC-" should read --FLUC- --.
    Figure 18A, "INTERRUPTION IS OCCURRED" should read --INTERRUPTION HAS OCCURRED--.

SHEET 20

Figure 21B:
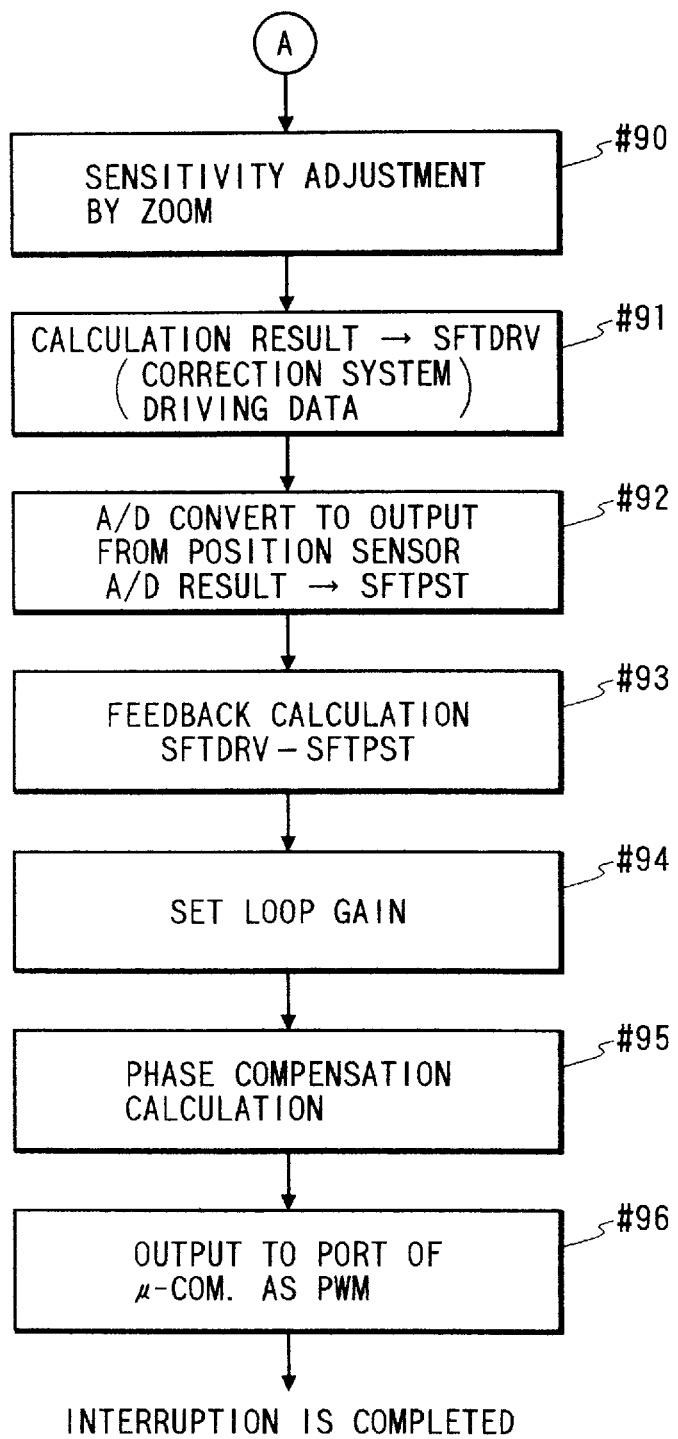
FIG. 21 is comprised of FIGS. 21A and 21B illustrating flow charts of a conventional image blur correction operation.

Figure 21A, "INTERRUPTION IS OCCURRED" should read --INTERRUPTION HAS OCCURRED--.

COLUMN 8

Line 46, "he" should read --the--.

COLUMN 9

Line 59, "is" should read --are--.

COLUMN 10

Line 17, "73'cy" should read --731cy--.

UNITED STATES PATENT AND TRADEMARK OFFICE
CERTIFICATE OF CORRECTION

PATENT NO. : 5,881,324
DATED : March 9, 1999
INVENTOR(S) : SHINJI IMADA

It is certified that error appears in the above-identified patent and that said Letters Patent is hereby corrected as shown below:

<u>COLUMN 14</u>

Line 16, "Steps #18" should read --¶ Steps #18--.
    Line 19, "the," should read --the--.

Signed and Sealed this

Twenty-first Day of September, 1999

Attest:

Q. TODD DICKINSON

*Attesting Officer*    *Acting Commissioner of Patents and Trademarks*